US012393150B2

(12) United States Patent
Hiramatsu et al.

(10) Patent No.: US 12,393,150 B2
(45) Date of Patent: Aug. 19, 2025

(54) IMAGE FORMING APPARATUS HAVING BLURRING SUPRESSION

(71) Applicant: CANON KABUSHIKI KAISHA, Tokyo (JP)

(72) Inventors: Takashi Hiramatsu, Tokyo (JP); Kazunari Hagiwara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/131,395

(22) Filed: Apr. 6, 2023

(65) Prior Publication Data

US 2023/0341802 A1 Oct. 26, 2023

(30) Foreign Application Priority Data

Apr. 26, 2022 (JP) ................................ 2022-072783

(51) Int. Cl.
*G03G 15/08* (2006.01)
*G03G 15/00* (2006.01)
*G03G 21/18* (2006.01)

(52) U.S. Cl.
CPC ....... *G03G 15/556* (2013.01); *G03G 15/0813* (2013.01); *G03G 15/0856* (2013.01); *G03G 21/1825* (2013.01); *G03G 2215/0154* (2013.01)

(58) Field of Classification Search
CPC ............. G03G 15/556; G03G 15/0806; G03G 2221/1654; G03G 15/0856; G03G 15/0896; G03G 2215/0154; G03G 2215/0617; G03G 2215/0802; G03G 2215/0852; G03G 2215/0888; G03G 15/0813; G03G 21/1825; G03G 21/1864; G03G 2221/1861; G03G 21/1647; G03G 21/1676; G03G 21/1821
See application file for complete search history.

(56) References Cited

U.S. PATENT DOCUMENTS 9,134,649 B2 9/2015 Orihara et al.
9,298,128 B2 3/2016 Orihara et al.
11,237,498 B2 2/2022 Gofuku
2008/0226310 A1* 9/2008 Togami ................ G03G 15/553 399/27
2016/0161899 A1* 6/2016 Noguchi ............ G03G 21/1821 399/101
2019/0018337 A1* 1/2019 Kawamoto .......... G03G 15/161

FOREIGN PATENT DOCUMENTS

JP 2006-251234 A 9/2006
JP 2016-126247 A 7/2016
JP 2021-081470 A 5/2021

* cited by examiner

*Primary Examiner* — Stephanie E Bloss
*Assistant Examiner* — Laura Roth
(74) *Attorney, Agent, or Firm* — VENABLE LLP

(57) ABSTRACT

In an image forming apparatus a period between a first image forming operation and a second image forming operation is a non-image forming period, and a developing unit is moved from a second position to a first position in a moving operation after the developing unit is moved from the first position to the second position in the non-image forming period in a case in which the consumption amount of the toner is equal to or less than a predetermined threshold value in the second image forming operation. A length of the non-image forming period in a case in which the moving operation is executed in the non-image forming period becomes longer than in a case in which the moving operation is not executed.

10 Claims, 11 Drawing Sheets

IMAGE FORMING APPARATUS HAVING BLURRING SUPRESSION

FIELD OF THE INVENTION AND RELATED ART

The present invention relates to an image forming apparatus, such as a printer, a copier, or a fax machine of an electrophotographic type or an electrostatic recording type.

In an image forming apparatus using the electrophotographic type, etc., a developing unit, which develops (visualizes) an electrostatic image (electrostatic latent image) which is formed on an image bearing member such as a photosensitive member (electrophotographic photosensitive member) by attaching toner as a developer, is used. The developing unit develops the electrostatic image on the image bearing member by bearing and feeding the toner to a developer bearing member (developing member) and supplying the toner from the developer bearing member to the image bearing member. In general, the toner is supplied to the developer bearing member by using a developer supplying member which is possible to include the toner in a foam layer.

In such an image forming apparatus, "blurring" in which image density becomes lower in a trailing end side of recording material with respect to a conveying direction may occur in a case that a high printing ratio image (high density image) (image in which toner consumption amount is high) such as a solid image is continuously formed. This is because an amount of the toner which is conveyed to the developer bearing member is insufficient with respect to an amount of the toner which is consumed by image forming.

Technique for suppressing the occurrence of such blurring is proposed. For example, in Japanese Laid-Open Patent Application (JP-A) 2016-126247, a method of supplying the toner to the developer bearing member by varying voltage which is applied to the developer supplying member in a sheet interval during continuous printing, thereby ensuring the amount of the toner which is held by the developer supplying member is proposed.

However, when the amount of the toner especially in the developing unit is low, conventional techniques are not sufficient to suppress blurring in a case that the high printing ratio image is continuously formed, etc. This is because it becomes difficult to hold enough toner to form the high printing ratio image on the developer supplying member, especially when the amount of the toner in the developing unit is low.

SUMMARY OF THE INVENTION

An object of the present invention is to provide an image forming apparatus capable of suppressing an occurrence of blurring even in a case that a high printing ratio image is continuously formed.

The object which is described above is achieved with the image forming apparatus according to the present invention. In summary, according to an aspect of the present invention, there is provided an image forming apparatus comprising: an image bearing member, an electrostatic image forming portion configured to form an electrostatic image on a surface of the image bearing member according to an image information, a developing unit including a developing member configured to supply toner onto the surface of the image bearing member and form a toner image by developing the electrostatic image formed on the surface of the image bearing member, and a developing container configured to accommodate the toner to be supplied to the developing member, a transfer member configured to transfer the toner image formed on the surface of the image bearing member to a recording material, a moving mechanism capable of moving the developing unit to a first position where a distance between the image bearing member and the developing member is a first distance and a second position where a distance between the image bearing member and the developing member is a second distance longer than the first distance, a control portion configured to control so as to execute an image forming operation in which a toner image is formed with the toner according to the image information, and a consumption amount acquiring portion configured to acquire consumption amount information correlating with consumption amount of the toner based on the image information, wherein when a period between a first image forming operation and a second image forming operation subsequent to the first image forming operation is defined as a non-image forming period, the control portion controls the moving mechanism to execute a moving operation in which the developing unit is moved from the second position to the first position after the developing unit is moved from the first position to the second position in the non-image forming period in a case in which the consumption amount of the toner indicated by the consumption amount information is equal to or less than a predetermined threshold value in the second image forming operation.

According to another aspect of the present invention, there is provided an image forming apparatus comprising: an image bearing member, an electrostatic image forming portion configured to from an electrostatic image on a surface of the image bearing member according to an image information, a developing unit including a developing member configured to supply toner onto the surface of the image bearing member and form a toner image by developing the electrostatic image formed on the surface of the image bearing member, and a developing container configured to accommodate the toner to be supplied to the developing member, a transfer member configured to transfer the toner image formed on the surface of the image bearing member to a recording material, a moving mechanism capable of moving the developing unit to a first position where a distance between the image bearing member and the developing member is a first distance and a second position where a distance between the image bearing member and the developing member is a second distance longer than the first distance, a control portion configured to control so as to execute an image forming operation in which a toner image is formed with the toner, and a toner amount acquiring portion configured to acquire toner amount information correlating with a toner amount in the developing container, wherein when a period between a first image forming operation and a second image forming operation subsequent to the first image forming operation is defined as a non-image forming period, the control portion controls the moving mechanism to execute a moving operation in which the developing unit is moved from the second position to the first position after the developing unit is moved from the first position to the second position in the non-image forming period in a case in which the toner amount indicated by the toner amount information is equal to or less than a predetermined threshold value after the first image forming operation and before the second image forming operation.

According to a further aspect of the present invention, there is provided an image forming apparatus comprising: an image bearing member, an electrostatic image forming portion configured to form an electrostatic image on a surface of the image bearing member according to an image information, a developing unit including a developing member configured to supply toner onto the surface of the image bearing member and form a toner image by developing the electrostatic image formed on the surface of the image bearing member, and a developing container configured to accommodate the toner to be supplied to the developing member, a transfer member configured to transfer the toner image formed on the surface of the image bearing member to a recording material, a moving mechanism capable of moving the developing unit to a first position where a distance between the image bearing member and the developing member is a first distance and a second position where a distance between the image bearing member and the developing member is a second distance longer than the first distance, a control portion configured to control so as to execute an image forming operation in which a toner image is formed with the toner according to the image information, and a consumption amount acquiring portion configured to acquire consumption amount information correlating with consumption amount of the toner based on the image information, wherein when a period between a first image forming operation and a second image forming operation subsequent to the first image forming operation is defined as a non-image forming period, the control portion controls the moving mechanism to execute a moving operation in which the developing unit is moved from the second position to the first position after the developing unit is moved from the first position to the second position in the non-image forming period in a case in which the consumption amount of the toner indicated by the consumption amount information is equal to or more than a predetermined threshold value in the first image forming operation.

Further features of the present invention will become apparent from the following description of exemplary embodiments with reference to the attached drawings.

DESCRIPTION OF THE EMBODIMENTS

In the following, an image forming apparatus of the present invention will be further specifically described with reference to the figures.

1. Overall Configuration and Operation of an Image Forming Apparatus

Figure 1:
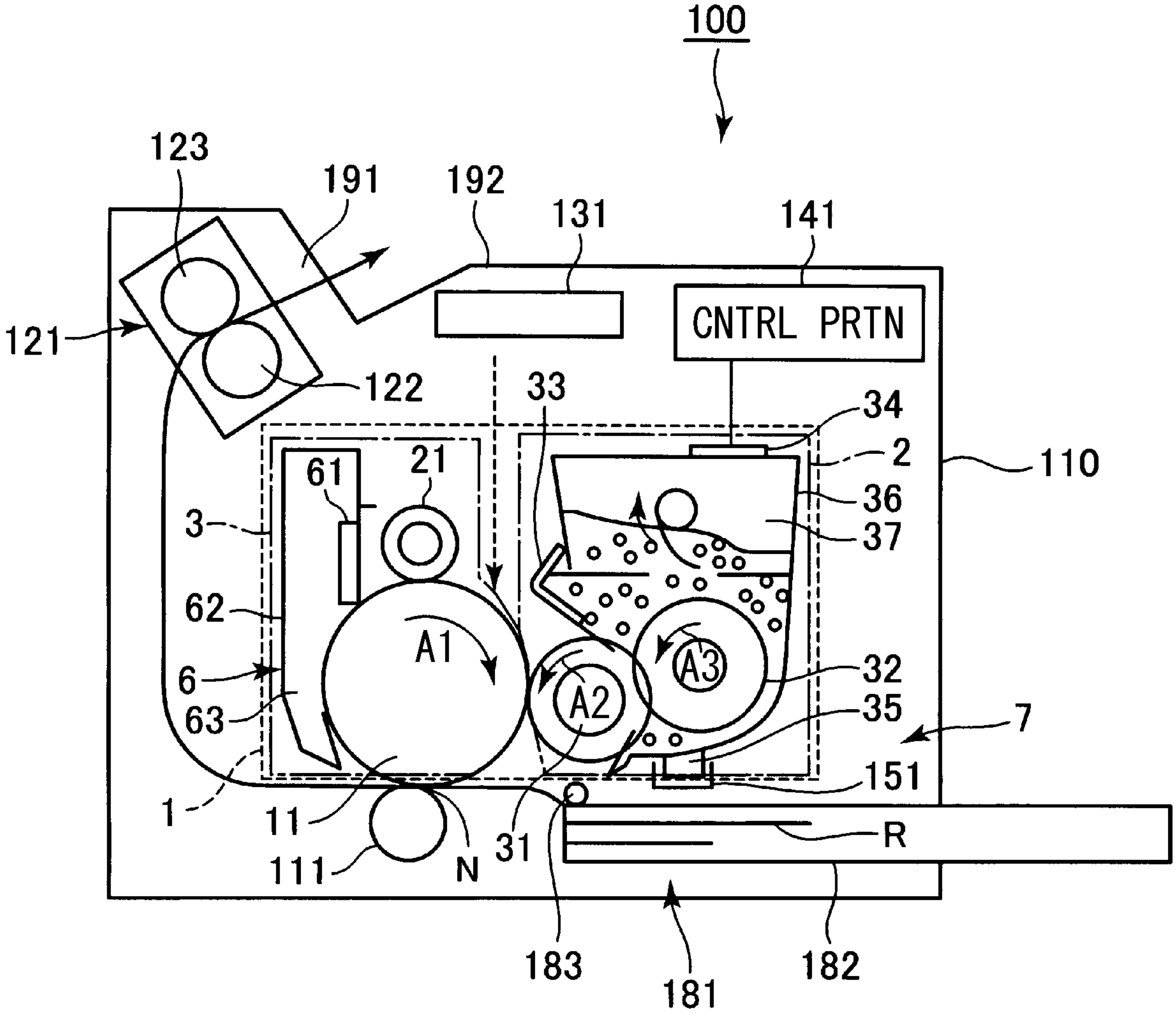
FIG. 1 is a schematic sectional view of an image forming apparatus according to a first embodiment (while a developing unit is in a contacting position).

FIG. 1 is a schematic sectional view of an image forming apparatus 100 according to the embodiment. Incidentally, FIG. 1 shows a state during image forming. The image forming apparatus 100 according to the embodiment is a laser printer capable of forming monochrome (black single color image) by using the electrophotographic type.

The image forming apparatus 100 includes a rotatable drum type (cylindrical) photosensitive member (photosensitive drum) 11 as an image bearing member. When a print job operation is started, the photosensitive member 11 is rotationally driven in a direction of an arrow A1 in the Figure (clockwise direction) by a driving force which is transmitted from a driving motor 161 (FIG. 3) as a driving source which configures a driving means. In the embodiment, the photosensitive member 11 is an organic photosensitive member which includes a conductive core metal which is made of a conductive material such as aluminum, a charge generating layer which is formed on the conductive core metal and a charge transporting layer which is formed on the charge generating layer.

A surface of the rotating photosensitive member 11 is uniformly charged to a predetermined potential of a predetermined polarity (negative polarity in the embodiment) by a charging roller 21 which is a roller type charging member as a charging means. A surface of the charging roller 21 (outer peripheral surface) is contacted against the surface (outer peripheral surface) of the photosensitive member 11. In the embodiment, the charging roller 21 is an elastic roller in which a surface of a cylindrical conductive supporting member is configured by being covered with an elastic layer which includes predetermined electrical resistance characteristics. The charging roller 21 is contacted against the surface of the photosensitive member 11 with a predetermined pressure when both end portions with respect to a direction of a rotational axis of the conductive supporting member are pressed by a spring. The charging roller 21 is rotationally driven in accordance with rotation of the photosensitive member 11. During the charging process, a predetermined charging voltage (charging bias) is applied to the charging roller 21 at predetermined timing from a charging power source 171 (FIG. 3) as a charging voltage applying means (charging voltage applying portion). In the embodiment, a DC voltage of negative polarity is applied to the charging roller 21 as charging voltage. A uniformly charged surface of the photosensitive member 11 (non-image portion) is dark potential of negative polarity.

The charged surface of the photosensitive member 11 is scanned and exposed by an exposure device (laser exposure unit) 131 as an exposure means (electrostatic image forming means) and an electrostatic image (electrostatic latent image) is formed on the photosensitive member 11. The exposure device 131 scans and exposes a laser beam on the surface of the photosensitive member 11 along a main scan direction (substantially parallel to a direction of a rotational axis of the photosensitive member 11) according to image information (image data). Further, the exposure device 131 repeats the exposure along the main scan direction which is described above, matching timing along a sub scan direction (substantially parallel to a moving direction of the surface of the photosensitive member 11) according to the image information. In this way, the electrostatic image is formed on the photosensitive member 11. An exposure portion (image portion, image portion), which is an exposed surface of the photosensitive member 11, is light potential.

The electrostatic image which is formed on the photosensitive member 11 is developed (visualized) when toner as developer is supplied by a developing unit (developing unit) 2 as a developing means, and a toner image (toner image, developer image) is formed on the photosensitive member 11. In the embodiment, the developing unit 2 applies single-component non-magnetic toner as the developer. The developing unit 2 includes a developer roller 31 as a developer bearing member (developing member). During developing, a surface (outer peripheral surface) of the developing roller 31 is contacted against the surface (outer peripheral surface) of the photosensitive member 11. Further, during developing, a predetermined developing voltage (developing bias) is applied to the developing roller 31 at predetermined timing from a developing power source 172 (FIG. 3) as a developing voltage applying means (developing voltage applying portion). In the embodiment, a DC voltage of negative polarity is applied to the developing roller 31 as a developing voltage. In the embodiment, the toner which is charged with the same polarity as that of the photosensitive member 11 (negative polarity in the embodiment) is attached to the exposure portion (image portion, image portion) on the photosensitive member 11 (reverse developing method) in which absolute value of the potential is decreased by being exposed after being uniformly charged. That is, in the embodiment, normal charging polarity of the toner, which is primary charging polarity of the toner during developing, is negative. Since developing is performed by potential difference with respect to light potential on the photosensitive member 11, a predetermined development voltage is applied to the developing roller 31. The developing roller 31 rotates in an opposite direction from the photosensitive member 11 (moving direction at a contact portion is forward). Further, in the embodiment, speed difference (surface speed of the developing roller 31 is faster than that of the photosensitive member 11) is set between the surface speed of the developing roller 31 and that of the photosensitive member 11. Further, charging assistant agent such as silica and titanium dioxide as an external additive, fluidity and chargeability of the toner are controlled by the external additive. The developing unit 2 will be described below and furthermore explained.

Opposing to the photosensitive member 11, a transfer roller 111 which is a roller type transfer member as a transfer means is arranged. The transfer roller 111 is pressed toward the photosensitive member 11 and forms a transfer portion (transfer nip portion) N which is a contact portion between the photosensitive member 11 and the transfer roller 111. The toner image which is formed on the photosensitive member 11 is transferred to recording material R which is nipped and conveyed between the photosensitive member 11 and the transfer roller 111 by an action of the transfer roller 111 at the transfer portion N. During transferring, a predetermined transfer voltage (transfer bias) is applied to the transfer roller 111 at predetermined timing from a transfer power source 175 (FIG. 3), which serves as a transfer voltage applying means (transfer voltage applying portion). In the embodiment, a DC voltage of positive polarity, which is opposite to the normal charging polarity of the toner as a transfer voltage, is applied to the transfer roller 111. Sheet-like recording material (transfer material, recording medium, sheet) R such as paper is supplied from a sheet feeding portion (feeding portion) to the transfer portion N. The paper feeding portion 181 includes a cassette 182 as a recording material accommodating portion, a feeding roller 183 as a feeding member, etc. The recording material R is accommodated in the cassette 182 and is conveyed to the transfer portion N by the conveying roller 183, etc., while timing is matched with the toner image on the photosensitive member 11.

The recording material R, onto which the toner image is transferred, is conveyed to the fixing device 121 as a fixing means. The fixing device 121 includes a fixing roller pair 122 and 123 which is configured of a fixing roller 122 which is provided with a heat source and a pressing roller 123 which presses against the fixing roller 122. The fixing device 121 applies heat and pressure to the recording material R which bears the unfixed toner image during process of nipping and conveying the recording material R by the fixing roller pair 122 and 123 and fix (melt, fix) the toner image on the recording material R. The recording material R on which the toner image is fixed is discharged (output) from a sheet discharge member (discharge member) 191 and stacked on a tray 192 which is provided in an upper portion of a main assembly of the image forming apparatus 100 (also referred to herein simply as "main assembly").

On the other hand, the toner (transfer residual toner) which remains on the photosensitive member 11 without being transferred to the recording material R at the transfer portion N is removed from the photosensitive member 11 and collected by a cleaning device 6 as a cleaning means. The cleaning device 6 includes a cleaning blade 61 as a cleaning member which is contacted against the surface of the photosensitive member 11 and a cleaning container 62 which forms a waste toner accommodating chamber 63 inside. In the cleaning device 6, the transfer residual toner is scraped off from the surface of the rotating photosensitive member 11 by the cleaning blade 61 and accommodated in the waste toner accommodating chamber 63. The cleaning blade 61 is mounted so that it contacts against the surface of the photosensitive member 11 in a counter direction with respect to a rotational direction of the photosensitive member 11. That is, the cleaning blade 61 contacts against the surface of the photosensitive member 11 so that a leading end on a free end portion side with respect to a short direction is facing an upstream side with respect to the moving direction of the surface of the photosensitive member 11. Further, the cleaning blade 61 contacts against the surface of the photosensitive member 11 with appropriate contacting pressure. By removing the transfer residual toner from the surface of the photosensitive member 11 with the cleaning device 6, it is possible to charge the surface of the photosensitive member 11 again by the charging roller 21 without toner etc. on the surface of the photosensitive member 11.

Incidentally, in the embodiment, the photosensitive member 11, the charging roller 21 as a process means which acts on the photosensitive member 11, the developing unit 2 and the cleaning device 6 configure a process cartridge 1 which is integrally dismountable from the main assembly 110. Further, the transfer roller 111, the exposure device 131, the fixing device 121, the control portion 141 and various power sources, etc. are mounted on the main assembly 110.

2. Process Cartridge

Next, the process cartridge 1 according to the embodiment will be further described below.

The process cartridge 1 is configured to include the developing unit (developing unit) 2 and a photosensitive member unit 3. The developing unit 2 includes the developing roller 31, a supplying roller 32, a developing blade 33 and a developing container 36, as will described below in detail. The photosensitive member unit 3 includes the photosensitive member 11, the charging roller 21 and the cleaning device 6. Further, the cleaning device 6 includes the cleaning blade 61 and the cleaning container 62 as described above. The cleaning container 62 supports the photosensitive member 11, the charging roller 21, the cleaning blade 61, etc. And the developing unit 2 and the photosensitive member unit 3 are coupled so that the developing unit 2 is swingable with respect to the photosensitive member unit 3 around a rotational axis which is substantially parallel to the direction of the rotational axis of the photosensitive member 11 as a center. More specifically, the process cartridge 1 is integrated since the developing container (developing frame) 36 of the developing unit 2 and the cleaning container (cleaning frame) 62 of the photosensitive member unit 3 are swingably coupled. Therefore, the developing unit 2 is possible to move between a contacting position in which the developing roller 31 contacts against the photosensitive member 11 and a spacing position in which the developing roller 31 spaces away from the photosensitive member 11, as will be described in detail below.

Further, a nonvolatile memory 34 as a storing means is mounted on the process cartridge 1. The nonvolatile memory 34 stores information such as lifetime information which is information about lifetime of the process cartridge 1 and toner amount information which is information about an amount of the toner in the developing unit 2. The nonvolatile memory 34 is connected to the control portion 141 which is provided with the main assembly 110, when the process cartridge 1 is mounted on the main assembly 110. This control portion 141 reads the information which is stored in the nonvolatile memory 34 and writes the information to the nonvolatile memory 34. The lifetime information and the toner amount information are updated by the control portion 141 as the process cartridge 1 is used, for example, each time an image forming is performed. Therefore, it is possible to provide the appropriate information, even when a power source of the image forming apparatus 100 is turned off or when one process cartridge 1 is used for two or more image forming apparatus 100.

Incidentally, as a toner amount detecting means which acquires the toner amount information, for example, it is possible to apply any available method from publicly known technologies as appropriate. For example, it is possible to apply a method in which a toner consumed amount is measured based on image information for forming an electrostatic image on the photosensitive member 11 and a toner amount in the developing unit 2 is sequentially detected (calculated, estimated) based on the toner consumed amount. In addition, it is also possible to apply detecting means such as an electrostatic capacity detecting method and an optical detecting method in order to sequentially detect the toner amount in the developing unit 2 or to detect that the toner amount in the developing unit 2 becomes below a predetermined value. These methods may be used in combination. The control portion 141 acquires the toner amount information by functioning as a toner amount detecting means or acquires the toner amount information from the toner amount detecting means, and then stores the toner amount information in the nonvolatile memory 34 of the process cartridge 1.

3. Developing Unit

Next, the developing unit (developing unit) 2 according to the embodiment will be further described.

The developing unit 2 includes the developing roller 31 as a developer bearing member (developing member), which bears and conveys the toner as a developer and develops an electrostatic image by supplying the toner to the electrostatic image which is formed on the surface of the photosensitive member 11. Further, the developing unit 2 includes the supplying roller (supply stripping roller) 32 as a developer supplying member (developer supply stripping member) which supplies the toner to the developing roller 31 and strips the toner from the developing roller 31. Further, the developing unit 2 includes a developing blade 33 as a regulating member which regulates the toner which is supplied onto the developing roller 31 to a predetermined toner amount. Further, the developing unit 2 includes the developing container 36 which forms a toner accommodating chamber 37 inside. Single component nonmagnetic toner as a developer is accommodated in the toner accommodating chamber 37.

The developing roller 31 and the supplying roller 32 are rotatably supported by the developing container 36, respectively. The supplying roller 32 is arranged so that its surface (outer peripheral surface) contacts the surface (outer peripheral surface) of the developing roller 31. The developing roller 31 bears the toner on its surface when the toner is supplied by the supplying roller 32. The toner which is borne on the surface of the developing roller 31 is frictionally charged while an amount of the toner is regulated by the developing blade 33, and conveyed to an opposing portion (developing portion) between the photosensitive member 11 and the developing roller 31. Further, the toner, which remains on the surface of the developing roller 31 after passing through the opposing portion (developing portion) between the photosensitive member 11 and the developing roller 31, is stripped from the surface of the developing roller 31 by the supplying roller 32 and return into the toner accommodating chamber 37.

In the embodiment, the developing roller 31 and the supplying roller 32 are rotationally driven respectively, when a driving force of the driving motor 161 (FIG. 3) which drives the photosensitive member 11 is transmitted. The developing roller 31 is rotationally driven in a direction of an arrow A2 (counterclockwise direction) in the figure. A rotational direction of the photosensitive member 11 is opposite to a rotational direction of the developing roller 31. That is, the developing roller 31 is rotationally driven in a direction so that a moving direction of the surface of the photosensitive member 11 and a moving direction of the surface of the developing roller 31 are in a forward direction at the opposing portion (contacting portion) between the photosensitive member 11 and the developing roller 31. Further, the supplying roller 32 is rotationally driven in a direction of an arrow A3 (counterclockwise direction) in the figure. The rotational direction of the developing roller 31 and the rotational direction of the supplying roller 32 are in a same direction. That is, the supplying roller 32 is rotationally driven in a direction so that the moving direction of the developing roller 31 and a moving direction of the supplying roller 32 are in a reverse direction at the opposing portion (contact portion) of the developing roller 31 and the supplying roller 32.

In the embodiment, the developing roller 31 is an elastic member roller, which is configured to be provided with a conductive elastic rubber layer which has a predetermined volume resistance as an elastic layer around a core metal which is made of metal. Further, in the embodiment, the supplying roller 32 is a foamed elastic member roller, which is configured to be provided with a foamed urethane layer which is adjusted to a predetermined volume resistance as an elastic layer around a core metal which is made of metal. On a surface layer of the foamed urethane layer, foamed cells are open and the toner is easily held and conveyed. Further, in the embodiment, the developing blade 33 is configured of a plate member which has flexibility. In the embodiment, the developing blade 33 is configured of an elastic plate which is made of SUS (stainless steel), etc. The developing blade 33 is arranged so that its longitudinal direction is substantially parallel to a direction of a rotational axis of the developing roller 31. Further, one end portion (fixed end portion) of the developing blade 33 with respect to its short direction is fixed to the developing container 36. Toner supplied to the developing roller 31 from the supply roller 32 is regulated by the developing blade 33 to form a uniform toner coat on the developing roller 31. The developing blade 33 is arranged so that a plate surface (side surface which extends along a longitudinal direction of the developing blade 33) near a leading end on a side of the other end portion (free end portion) with respect to its short direction slides on the surface of the conductive elastic rubber layer of the developing roller 31. Therefore, by the developing blade 33, the toner on the developing roller 31 is frictionally charged and a charge is applied at a same time with forming a toner coat on the developing roller.

Further, in the embodiment, the image forming device 100 is configured so that it is possible to appropriately set potential (voltage which is applied to each) of each of the developing roller 31, supplying roller 32 and developing blade 33. The voltage which is applied to the developing roller 31 is set to voltage so that contrast to the light potential and the dark potential which are described above is appropriate. Further, the voltage which is applied to the supplying roller 32 is set to voltage so that supplying the toner mainly to the developing roller 31 is appropriately performed. Further, the voltage which is applied to the developing blade 33 is set to voltage so that applying the charge mainly to the toner is appropriately performed. Therefore, the voltage which is applied to the supplying roller 32 and the voltage which is applied to the developing blade 33 are set to be appropriate for the voltage which is applied to the developing roller 31, respectively. In the embodiment, the voltage which is applied to the supplying roller 32 and the voltage which is applied to the developing blade 33 are set so that potential difference relative to the voltage which is applied to the developing roller 31 is −100V, respectively. This is because the negatively charged toner is used in the embodiment. That is, the potential of the supplying roller 32 and the potential of the developing blade 33 are set so that the potential difference relative to the potential of the developing roller 31 is negative potential difference, respectively. Accordingly, the potential of the supplying roller 32 and the potential of the developing blade 33 are set to be higher potential on a side of the normal charging polarity of the toner (negative polarity in the embodiment) than the potential of the developing roller 31, respectively. Therefore it is possible to appropriately supply the toner to the developing roller 31 by urging the toner from the supplying roller 32 toward the developing roller 31. Further, it is possible to appropriately apply a charge of normal charge polarity to the toner by the developing blade 33.

In this way, during developing, predetermined developing voltage (developing bias) is applied to the developing roller 31 at predetermined timing from the developing power source 172 (FIG. 3) as a developing voltage applying means (developing voltage applying portion). In the embodiment, a DC voltage of negative polarity is applied to the developing roller 31 as a developing voltage. Further, during developing, predetermined supplying voltage (supplying bias) is applied to the supplying roller 32 at predetermined timing from the supplying power source 173 (FIG. 3) as a supplying voltage applying means (supplying voltage applying portion). In the embodiment, a DC voltage is applied to the supplying roller 32, which is higher on the side of the normal charging polarity of the toner (negative polarity in the embodiment) than the developing voltage as the supplying voltage. Further, during developing, predetermined regulating voltage (regulating bias) is applied to the developing blade 33 at predetermined timing from a regulating power source 174 (FIG. 3) as a regulating voltage applying means (regulating voltage applying portion). In the embodiment, a DC voltage is applied to the developing blade 33, which is higher on the side of the normal charging polarity of the toner (negative polarity in the embodiment) than the developing voltage as the regulating voltage.

4. Configuration and Operation of Contacting/Spacing Mechanism

Next, a configuration and an operation of a contacting/spacing mechanism 7 as a contacting/spacing means, which is an example of a moving mechanism as a moving means in the embodiment, will be described.

Figure 2:
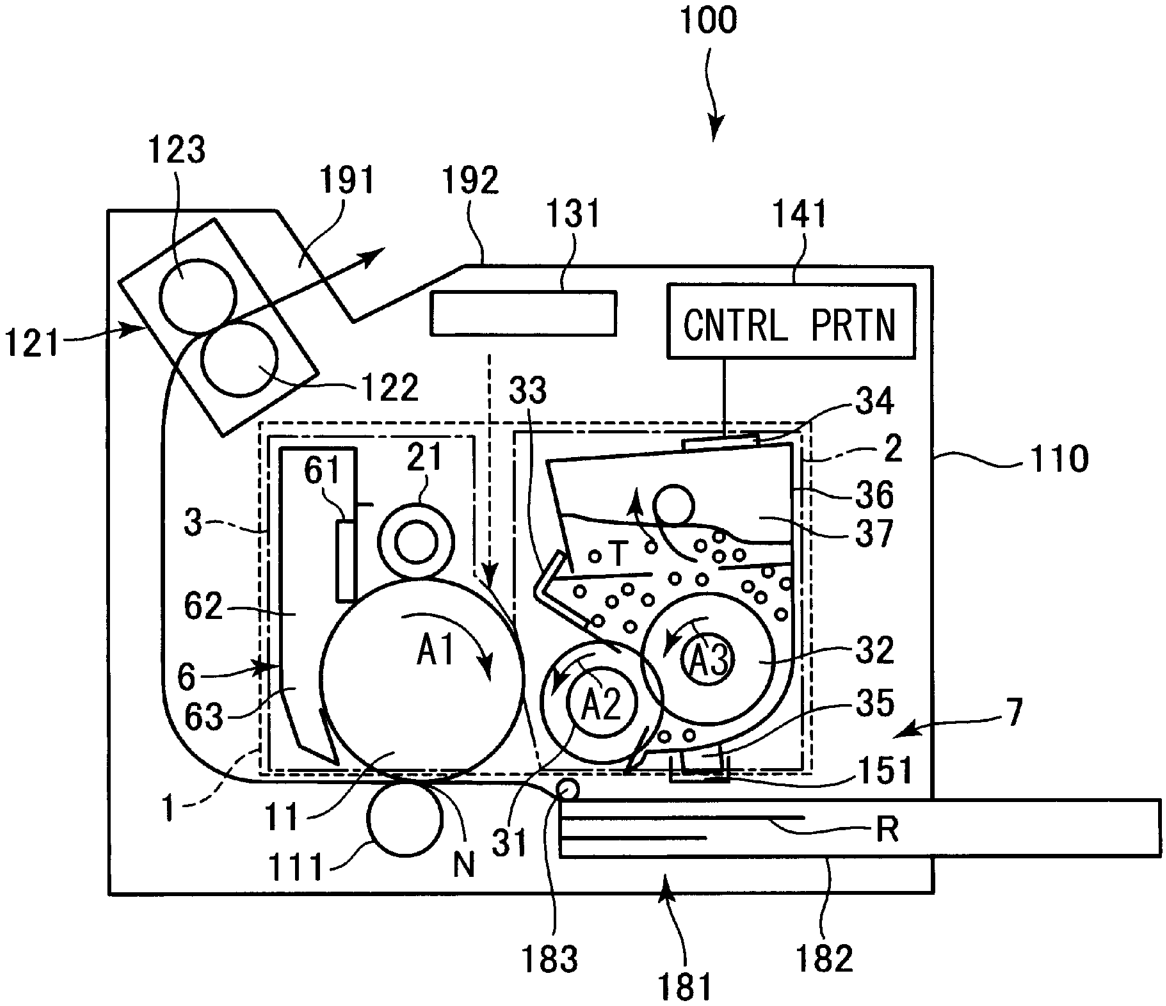
FIG. 2 is a schematic sectional view of the image forming apparatus according to the first embodiment (while a developing unit is in a spacing position).

The contacting/spacing mechanism 7 includes a lever 35 as an action receiving portion which is provided with the developing container 36 of the developing unit 2, a moving portion 151 as an action portion which is provided with the main assembly 110, a contacting/spacing driving portion 162 (FIG. 3) as a driving means for moving the moving portion 151, etc. Further, as described above, the developing unit 2 is coupled to the photosensitive member unit 3 so that it is swingable around a rotational axis which is substantially parallel to the direction of the rotational axis of the photosensitive member 11 as a center. When the contacting/spacing driving portion 162, etc. operates the moving portion 151 and the lever 35 is moved, it is possible to swing the developing unit 2 and move the developing unit 2 between the contacting position (FIG. 1) and the spacing position (FIG. 2). That is, the contacting/spacing mechanism 7 moves the developing unit 2 between the contacting position (first position) in which the developing roller 31 contacts against the photosensitive member 11 and the spacing position (second position) in which the developing roller 31 spaces away from the photosensitive member 11. FIG. 1 is a schematic sectional view of the image forming apparatus 100 according to the embodiment, showing that the developing unit 2 is arranged in the contacting position. FIG. 2 is a schematic sectional view of the image forming apparatus 100 according to the embodiment, showing that the developing unit 2 is arranged in the spacing position.

In the embodiment, in general, during image forming (during developing), the developing unit 2 is arranged in the contacting position and the developing roller 31 is contacting against the photosensitive member 11. Further, during non-image forming (for example, a standby state, a sleep state, and a power off state), the developing unit 2 is arranged in the spacing position and the developing roller 31 is spaced away from the photosensitive member 11. In this way, it is possible to maintain performance of the photosensitive member 11 throughout a lifetime of the process cartridge 1, since the developing roller 31 contacts against the photosensitive member 11, only when necessary, and wear of the charge transporting layer on the top surface of the photosensitive member 11 is minimized.

Movement of the developing unit 2 to the contacting position is performed by spring urging force with an extension spring (not shown) as an urging means which is attached to the photosensitive member unit 3 and the developing unit 2 on its both ends, and a rotational moment around driving input to the developing unit 2 when the developing unit 2 is driven. When holding force of the lever 35 by the moving portion 151 is released by the contacting/spacing driving portion 162, the moving portion 151 moves toward a side of the photosensitive member 11 together with the lever 35 by the spring urging force and the rotational moment which are described above. Therefore, it is possible to move the developing unit 2 to the contacting position and to become a state that the developing roller 31 contacts against the photosensitive member 11 (FIG. 1). Conversely, in order to move the developing unit 2 to the spacing position, the contacting/spacing driving portion 162 moves the moving portion 151 away from the photosensitive member 11 and the lever 35 is moved in a same direction and is held. Therefore, it is possible to move the developing unit 2 to the spacing position and to become a state that the developing roller 31 spaces away from the photosensitive member 11 (FIG. 2). Incidentally, the contacting/spacing driving portion 162 is configured to include a motor or solenoid as a driving source, a driving transmission member, etc. As described above, since the developing roller 31 contacts against the photosensitive member 11 by spring urging force when the holding force of the lever 35 is released when moving to the contacting position, the developing roller 31 contacts against at a faster speed than a moving speed of the moving portion 151. On the other hand, in the spacing operation, since the developing roller 31 is moved by the moving portion 151 from the contacting state, the speed of the developing roller 31 is almost the same as the speed of the moving portion 151.

In the embodiment, when the developing unit 2 is arranged in the spacing position, transmission of driving from the driving motor 161 to a side of the developing unit 2 (the developing roller 31, the supplying roller 32) is interrupted by a clutch (not shown) as a driving transmission releasing means, and the driving of the developing unit 2 is stopped. Therefore, it is possible to suppress deterioration of members of the developing unit 2 and the toner by stopping driving of the developing unit 2 when the developing unit 2 is in the spacing position.

5. Control Mode

Figure 3:
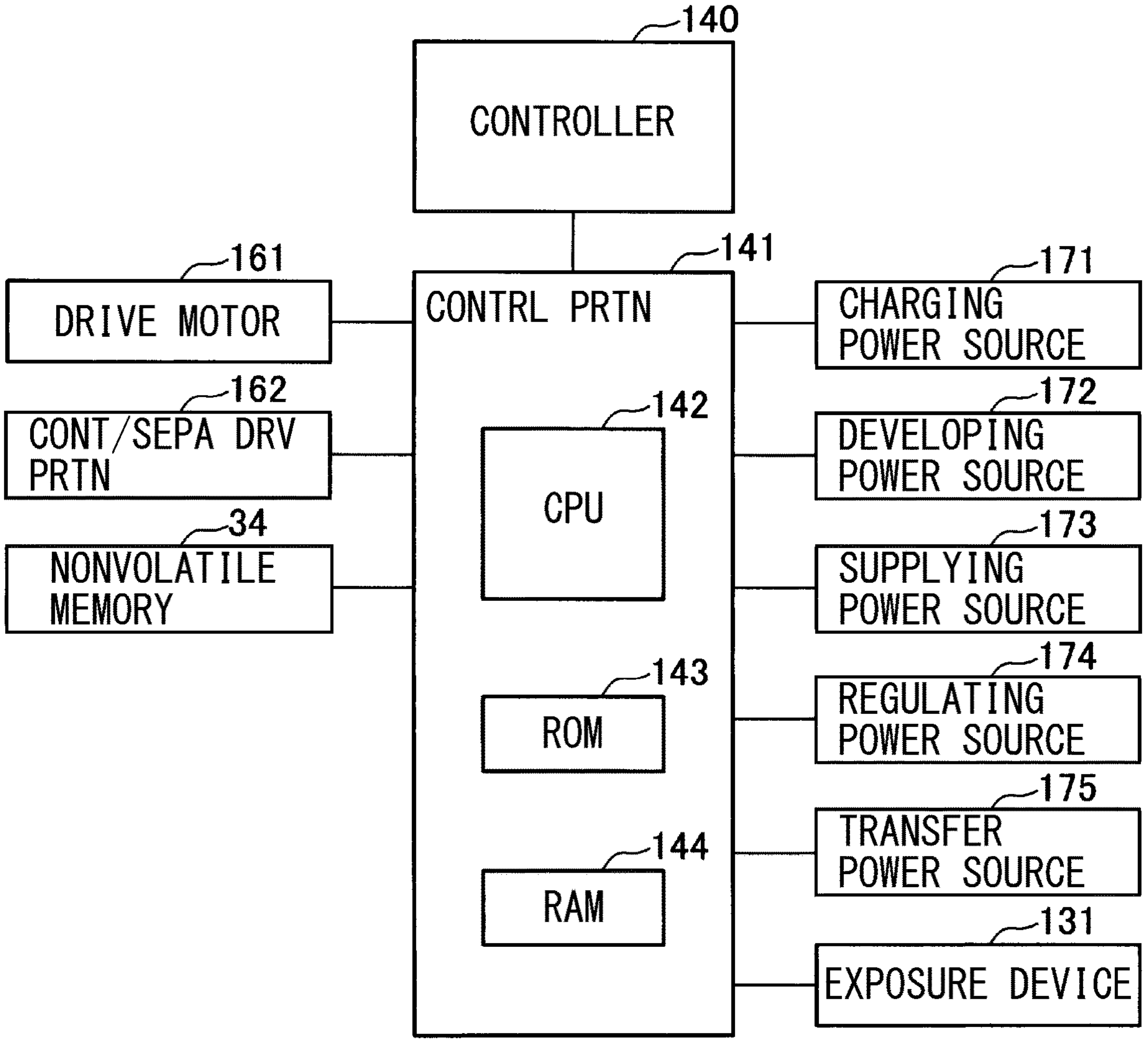
FIG. 3 is a schematic block diagram showing a control mode of the image forming apparatus.

FIG. 3 is a schematic block diagram showing a control mode of the image forming apparatus 100 according to the embodiment. The control portion 141, which performs control for a whole of the image forming apparatus 100, is provided with the image forming apparatus 100. The control portion 141 is configured to include a CPU 142 as a computation processing means, a ROM (including a rewritable one) 143 and a RAM 144 as a storing means, and an input/output portion (not shown) which controls to send and receive information to/from devices which are external to the control portion 141, etc. The CPU 142 comprehensively controls each portion of the image forming apparatus 100 according to a control program which is stored in the ROM 143. The RAM 144 temporarily saves control data and is also used as a workspace for computation processing which is associated with the control. For example, the driving motor 161, the charging power source 171, the developing power source 172, the supplying power source 173, the regulating power source 174, the transfer power source 175, the contacting/spacing driving portion 162, the exposure device 131, etc. are connected. Further, as described above, when the process cartridge 1 is mounted on the main assembly 110, the nonvolatile memory 34 which is mounted on the process cartridge 1 is connected to the control portion 141.

Further, a controller 140 is connected to the control portion 141. The controller 140 receives print instructions (image information, various setting information, start instruction) from an external device (not shown) such as a personal computer (host computer) according to operation by an operator such as a user. When the controller 140 receives the print instruction, the controller 140 delivers information about a size of the image which is printed, information in which image information which is included in the print instruction is converted into a laser emitting control signal, etc. to the control portion 141 as print commands. The control portion 141 controls each portion of the image forming apparatus 100 based on the information which is received and executes an operation of the print job (which will be described below).

Figure 4:
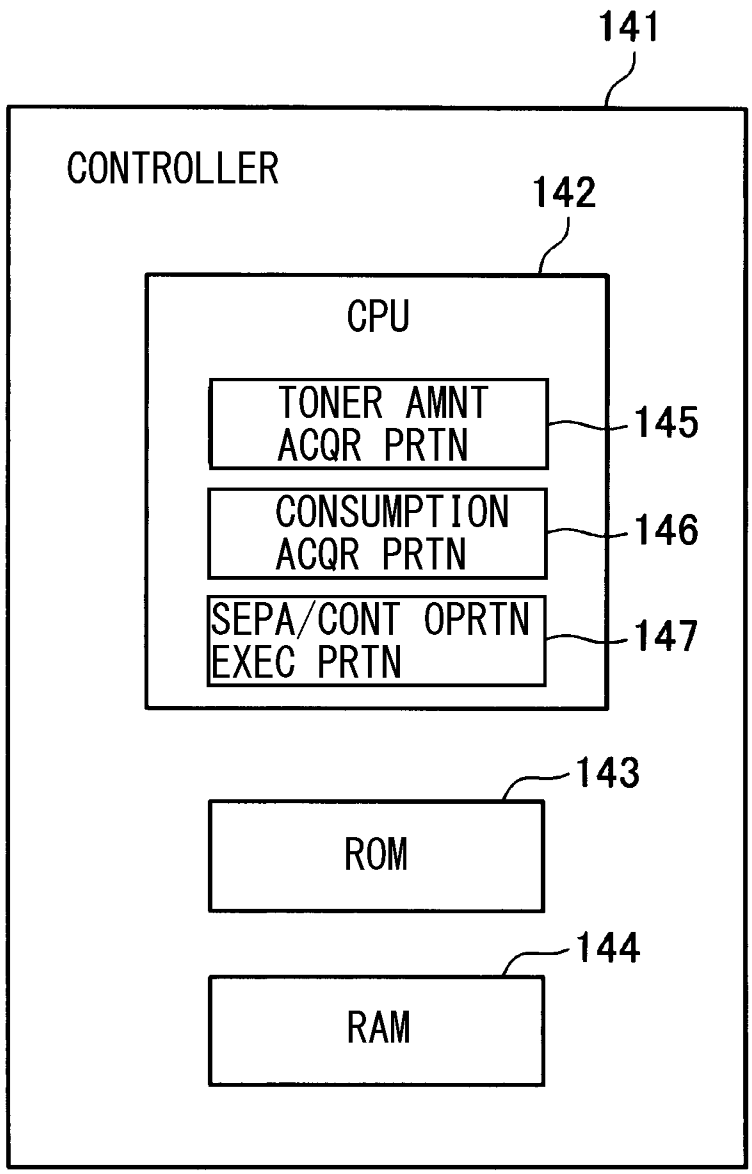
FIG. 4 is a schematic diagram showing an example of a functional block of a control portion.

FIG. 4 is a schematic diagram showing an example of a functional block of the CPU 142 of the control portion 141 according to the embodiment. In the embodiment, the CPU 142 is possible to function as a toner amount acquiring portion 145, a consumption amount acquiring portion 146, a separation/contact operation executing portion 147, etc. by executing the program which is stored in the ROM 143. The toner amount acquiring portion 145 acquires toner amount information as described above. Further, the consumption amount acquiring portion 146 also acquires index values (consumption amount information) related to the consumption amount of toner from the developing apparatus 2 associated with image forming portion, as described below in detail. Further, the separation/contact operation executing portion 147 controls the contacting/spacing mechanism 7 so that the separation/contact operation of the developing unit 2 is executed at a sheet interval during continuous printing, as will be described below in detail.

Here, the image forming apparatus 100 executes the print job, which is a series of operations, which are initiated by a single start instruction, to form and output an image on the single or the plurality of recording materials R. In general, the print job includes an image forming process, a pre rotation process, a sheet interval process in a case of forming an image on the plurality of recording materials R. and a post rotation process. The image forming process is a period when an electrostatic image of an image which is actually formed and output on the recording material R is formed, a toner image is transferred and the toner image is fixed, and an image forming time (image forming period) refers to the period. More precisely, a timing of the image forming time differs depending on positions in which each of processes of the electrostatic image forming, the toner image forming, the toner image transferring, and the toner image fixing is performed. The pre rotation process is a period when preparatory operation prior to the image forming process from a time when the start instruction is input to a time when an image begins to be actually formed is performed. The sheet interval process (image interval process) is a period which is corresponding to an interval between the recording material R and the recording material R when image forming on the plurality of recording materials R is performed continuously (continuous image forming, continuous printing). The post rotation process is a period when adjustment operation (preparatory operation) after the image forming process is performed. Non-image forming time (non-image forming period) is a period other than image forming time, and includes the pre rotation process, the sheet interval process, and the post rotation process which are described above and further the pre multiple rotation process which is the preparatory operation when the image forming apparatus 100 is turned on or returns from sleep state. Further, the non-imaging forming time includes the standby state (power is on and waiting for issuing the print job), the sleep state (state that power consumption is lower than the standby state and waiting for returning to the standby state, etc.), the power off state, etc.

6. Overview of Control in the Embodiment

As described above, "blurring" in which image density becomes lighter at a rear end side with respect to a conveying direction of the recording material R may occur, in a case that high printing ratio image (image in which toner consumption amount is high), such as a solid image, is continuously formed, etc. especially when the toner in the developing unit 2 is reduced. This is because an amount of the toner which is conveyed to the developing roller 31 is insufficient with respect to an amount of the toner which is consumed by image forming.

Therefore, in the embodiment, control is performed so as to execute an operation (here, also referred to as "separation/contact operation") to contact against the photosensitive member 11 after the developing roller 31 spaces away from the photosensitive member 11 by the contacting/spacing mechanism 7 during a sheet interval (between images) in continuous printing. In the embodiment, the control portion 141 executes the separation/contact operation of the developing unit 2 in a case that the amount of the toner in the developing unit 2 is below a predetermined threshold value, a case that index value (consumption amount information) which is related to the consumption amount of the toner from the developing unit 2 due to image forming is above predetermined threshold value, or a case that both conditions are satisfied. In the embodiment, in a case that the separation/contact operation of the developing unit 2 is performed based on the consumption amount of the toner from the developing unit 2 due to image forming, the control portion 141 acquires the index value (consumption amount information) which is related to the consumption amount of the toner from the developing unit 2 due to image forming based on image information for forming an electrostatic image on the photosensitive member 11 in continuous printing. And the control portion 141 controls so as to execute the separation/contact operation during a sheet interval (between images) in continuous printing, in a case that integrated value of the index value (cumulative value) which is described above exceeds the predetermined threshold value in continuous printing. Further, in the embodiment, the control portion 141 acquires the index value which is described above for each region in which an image forming region (region in which it is possible to form the toner image) on the photosensitive member 11 is divided into a plurality of regions with respect to a main scanning direction.

By executing the separation/contact operation of the developing unit 2 during a sheet interval in continuous printing, it is possible to suppress an occurrence of blurring, when the toner, which adheres to a wall surface etc. in the developing unit 2 and is difficult to use for image forming as it is, is moved, and the toner is supplied to the developing roller 31. Therefore, especially when the amount of the toner in the developing unit 2 is reduced, it is possible to suppress the occurrence of blurring and form a high quality image, even in a case high printing ratio image such as when an entire surface solid black is continuously formed. Further, by acquiring the index value which is described above for each of the plurality of divided regions of image forming region on the photosensitive member 11 with respect to the main scanning direction, even in a case that the toner consumption amount is locally high with respect to the main scanning direction, it is possible to effectively suppress occurrence of blurring while executing the separation/contact operation of the developing unit 2. More specific details will be described below.

Next, acquiring high printing ratio index value (here, it is also referred to as "calculation of high printing ratio region") in order to determine high printing ratio region (region in which the toner consumption amount is high) in the image which is printed. In the embodiment, the control portion 141 acquires the high printing ratio index value based on toner consumption amount classification information (image density classification information, printing ratio classification information) in which the control portion 141 is received from the controller 140. The controller 140 divides the image information which is requested to be printed by the print instruction which is received from the external device into each of predetermined sizes, and delivers the toner consumption amount classification information for each of the divided region to the control portion 141 along with the print commands. That is, the controller 140 delivers the toner consumption amount classification information for each of the divided regions which is described above of the image to the control portion 141 along with the print commands for each image which is formed on a single sheet of recording material R. By inputting the toner consumption amount classification information in the print commands, it is possible for the control portion 141 to determine whether the image is the high printing ratio image or not before executing image forming operation according to the print commands.

In the embodiment, firstly, the toner consumption amount classification information in which the controller 140 delivers to the control portion 141 is broadly classified into three classes, depending on image density (printing ratio) and whether it is text data or not. Image density of a solid image (highest density level, maximum toner application amount) is defined as 100%, and it is divided into three classes, "Class 1" as the image density is 80% or higher, "Class 2" as the image density is less than 80% and "Class 3" as text data which is not related with the image density. Furthermore, for each of the three classes, four levels of values are assigned according to area ratio of an image (area ratio of an image for each class in each divided region which is described above). In a case that the area ratio is 80% or more, "3" is assigned; in a case that the area ratio is 60% or more and less than 80%, "2" is assigned; in a case that the area ratio is 40% or less and less than 60%, "1" is assigned; and in a case that the area ratio is less than 40%, "0" is assigned. For example, in a case of a solid image with 100% image density, "3" is assigned to "Class 1", and "0" is assigned to "Class 2" and "Class 3" respectively. Further, for example, in a case of text data, "0" is assigned to "Class 1" and "Class 2", and value corresponding to the area ratio of the text data is assigned to "Class 3". The value which is assigned to each class is delivered from the controller 140 to the control portion 141 for each of the divided regions which are described above as the toner consumption amount classification information.

In the embodiment, the controller 140 divides the image forming region into 16 with respect to the main scanning direction (size of each of the divided regions which are described above is equal in the embodiment) and the toner consumption amount classification information which is described above for each of the divided regions is delivered to the control portion 141. And, as will be described below, the control portion 141 determines whether or not each of the divided regions which are described above is a high printing ratio region based on the toner consumption amount classification information for each of the divided regions which are delivered and described above.

In the embodiment, the control portion 141 determines whether or not the region is the high printing ratio region based on value of "Class 1" which is described above. That is, in the embodiment, the control portion 141 uses the value of "Class 1" in the toner consumption amount classification information as the "high printing ratio index value", which is an example of index value which is related to the toner consumption amount from the developing unit 2 which is associated with image forming. This is due to a reason which will be described below. That is, in a configuration according to the embodiment, in a case that high printing ratio image (image with high toner consumption amount) is output continuously, blurring may occur because the toner is not supplied to the developing roller 31 in time. However, this is because the amount of the toner which is supplied is sufficient with respect to the amount of the toner which is consumed in the image with an image density of less than 80%, so there is no need to execute special operation for image in which the image density is less than 80%.

8. Control of Separation/Contact Operation of Developing Unit

Figure 5:
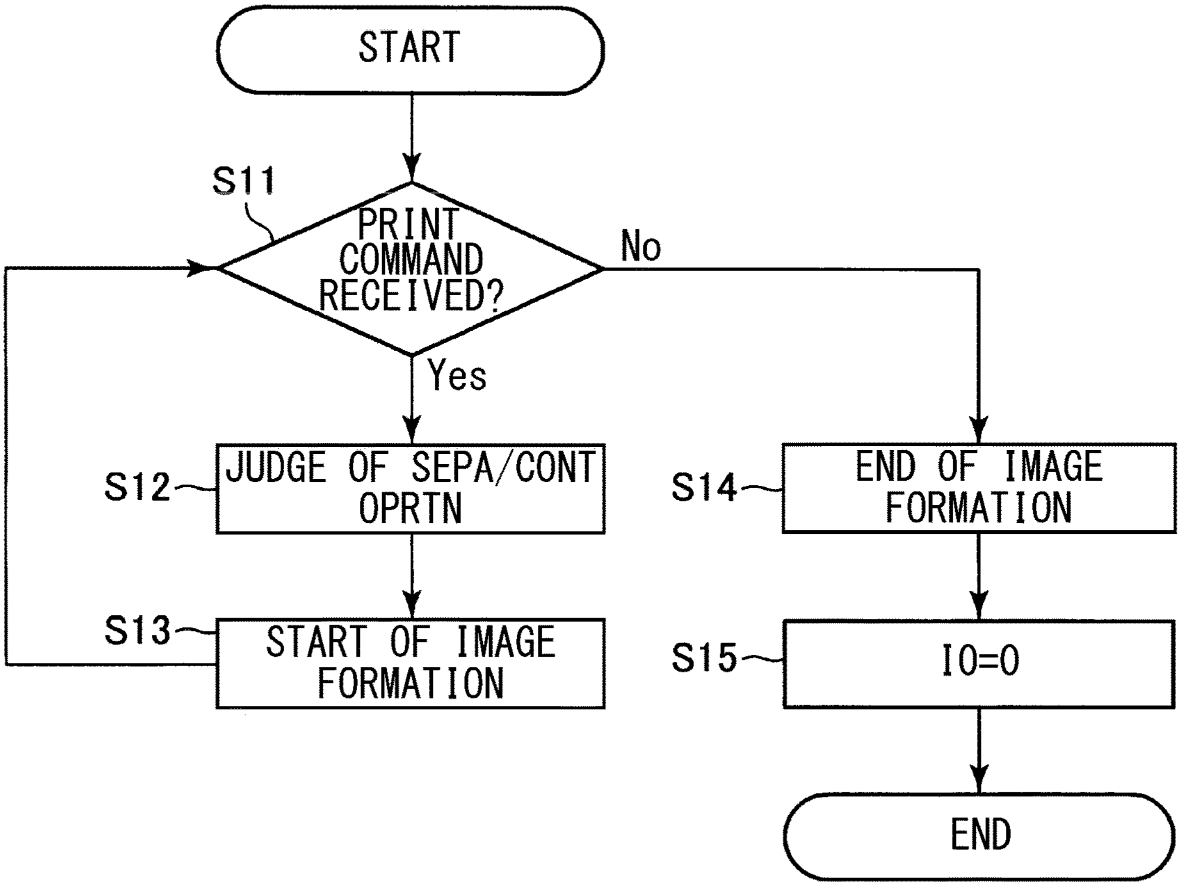
FIG. 5 is a flow chart showing a procedure of a print job according to the first embodiment.
Figure 6:
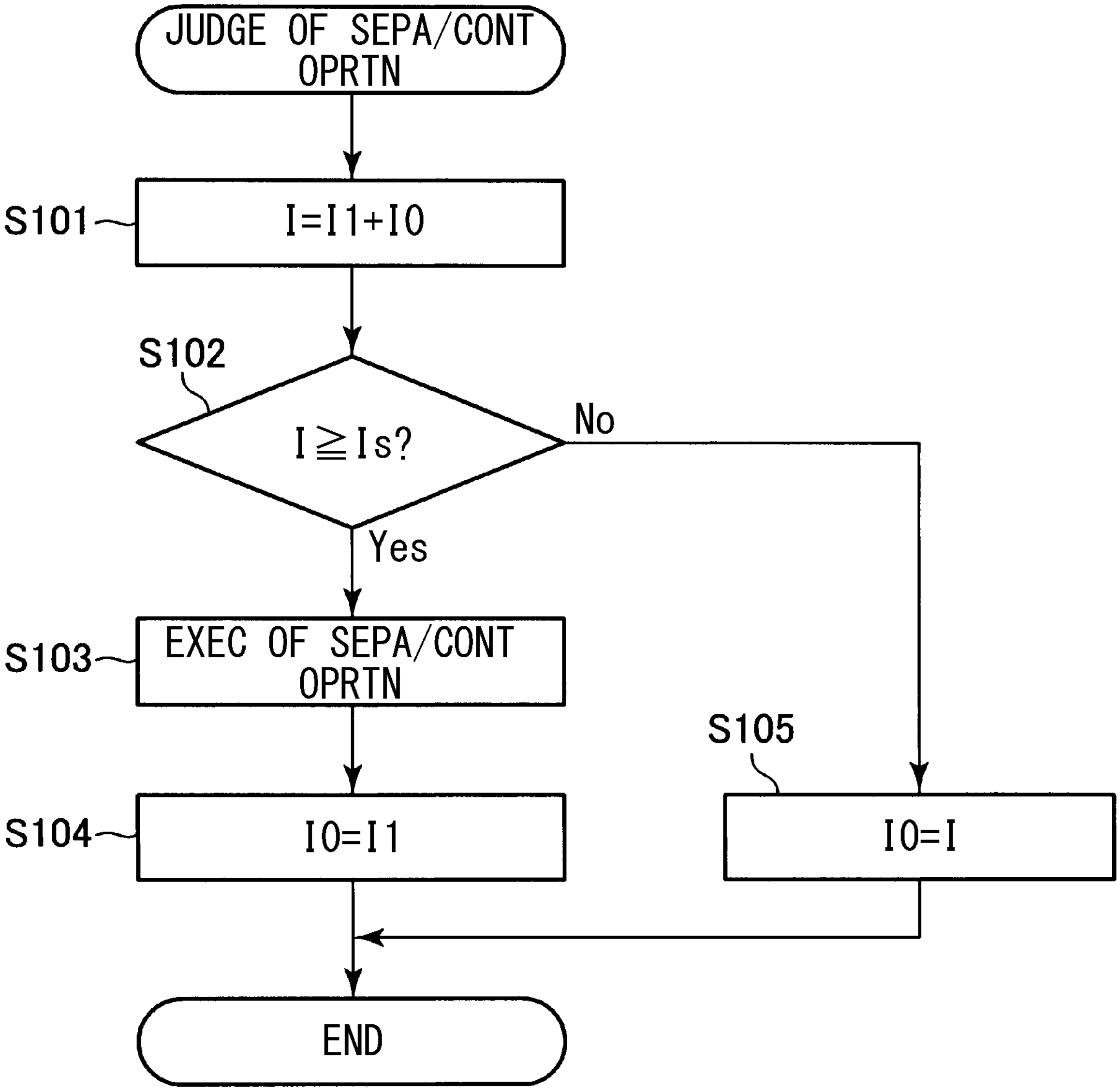
FIG. 6 is a flow chart showing a procedure of a separation/contact operation determination according to the first embodiment.
Figure 7:
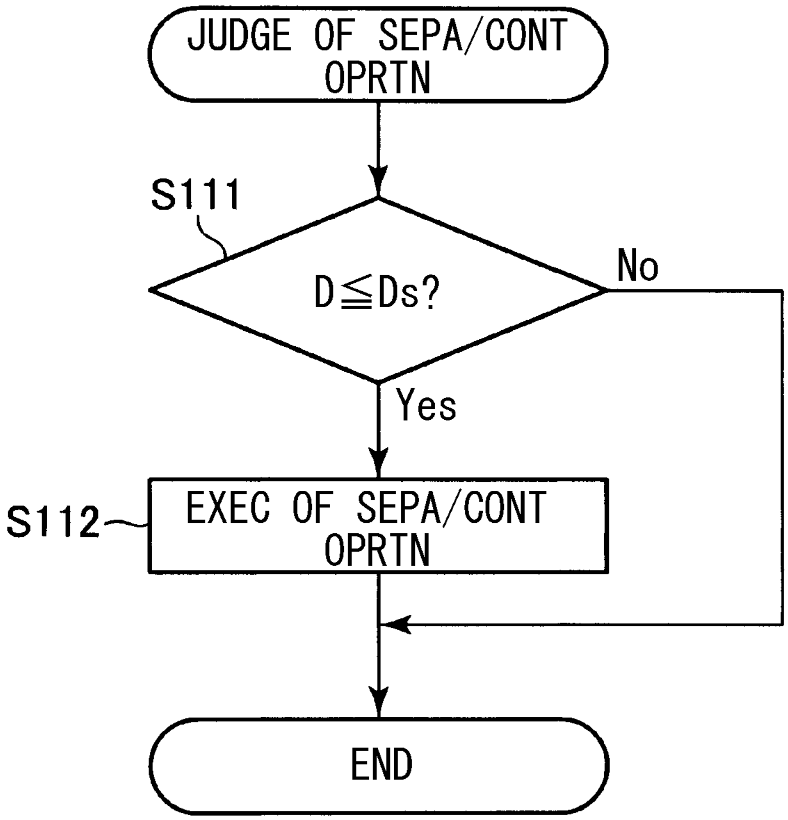
FIG. 7 is a flow chart showing the procedure of the separation/contact operation determination according to the first embodiment.
Figure 8:
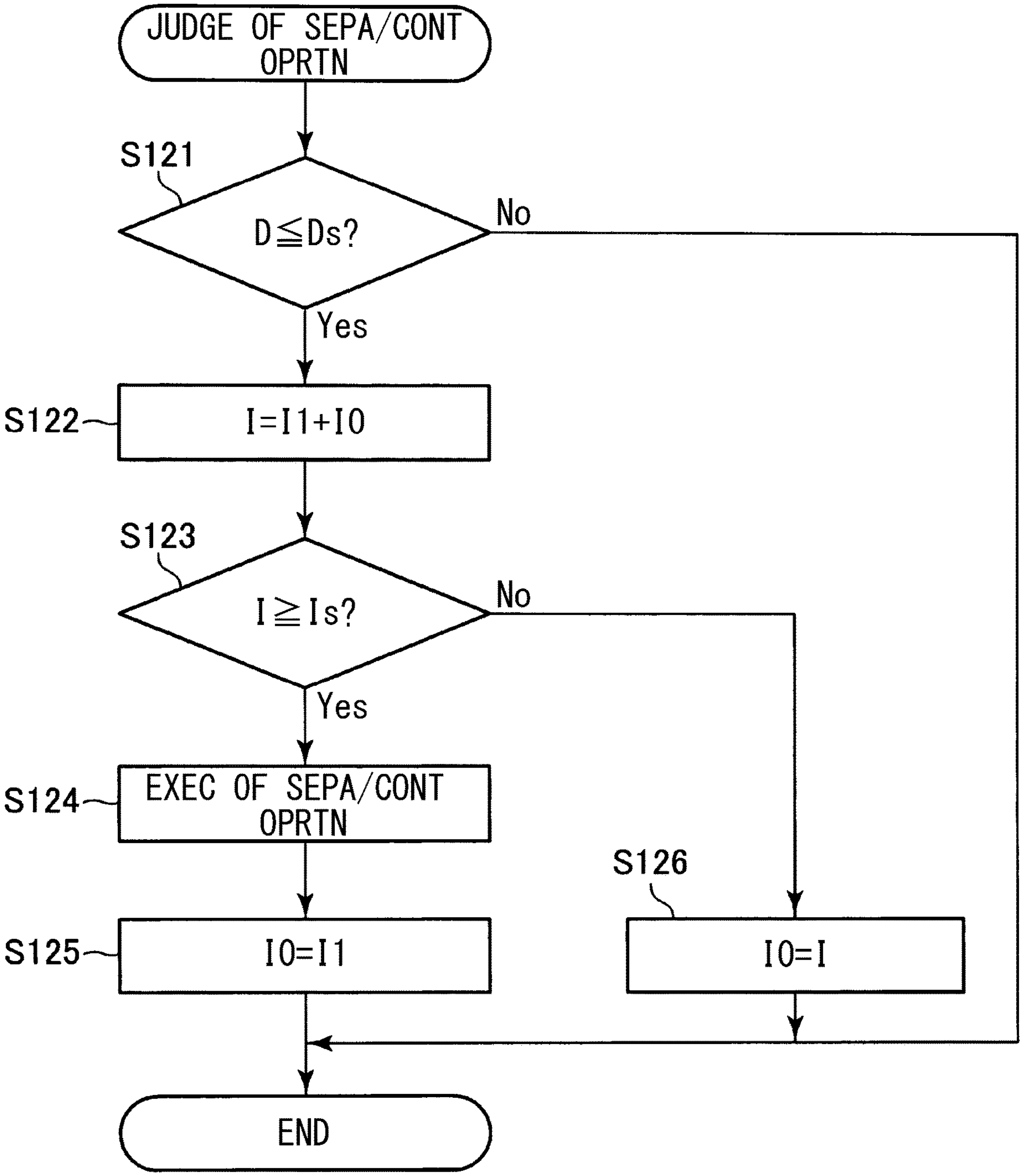
FIG. 8 is a flow chart showing the procedure of the separation/contact operation determination according to the first embodiment.

Next, the control of the separation/contact operation of the developing unit 2 according to the embodiment will be described. FIG. 5 is a flow chart showing an outline of an entire procedure of the print job, which includes decision whether it is necessary or not to execute the separation/contact operation of the developing unit 2 according to the embodiment (here, it is also referred to as "separation/contact operation decision"). Further, FIG. 6, FIG. 7 and FIG. 8 are flow charts showing outlines of procedures for the separation/contact operation decisions according to the embodiment.

<Entire Procedure of Print Job>

First of all, an entire procedure of a print job will be described by using FIG. 5.

S11: When a print instruction (print job information) is input to the controller 140 from an external device according to an operation by an operator such as a user, the control portion 141 receives a print command from the controller 140 corresponding to an image which is printed. When the control portion 141 receives the print command from the controller 140 ("Yes"), it proceeds to a process S12. On the other hand, when the control portion 141 executes specified number of sheets of image forming of the print job, since the print command is no longer sent from the controller 140 ("No"), the control portion 141 proceeds to a process S14. That is, in continuous printing, the print command is sent to the control portion 141 one sheet by one sheet.

S12: When the control portion 141 receives the print command, it executes the separation/contact operation decision. The separation/contact operation decision will be described by using FIG. 6, FIG. 7 and FIG. 8.

S13: The control portion 141 starts image forming after executing the separation/contact operation decision. In a case that a first sheet of image forming from a state that the image forming apparatus 100 is stopped, the image forming operation is started by the process which is described above. When the control portion 141 receives the print commands of a second and subsequent images in continuous printing, each driving of various portions and application of various voltages are performed in a previous S13 process. Therefore, the image forming operation is performed from a state in which the developing unit 2 is also arranged in the contacting position.

S14: The control portion 141 terminates the image forming operation, moves the developing unit 2 to the spacing position and stops driving of each portion (the photosensitive member 11, the developing unit 2, etc.) of the image forming apparatus 100.

S15: The control portion 141 resets high printing ratio integrated value I0 which is temporarily stored in the RAM 144 in the control portion 141 to an initial value (0 in the embodiment). The high printing ratio integrated value I0 will be described below.

<Procedure of Separation/Contact Operation Decision>

Next, a procedure of separation/contact operation decision will be described by using FIG. 6, FIG. 7 and FIG. 8. Methods of the separation/contact operation decision in FIG. 6, FIG. 7 and FIG. 8 differ from each other. In the procedure which is shown in FIG. 6, whether or not to execute the separation/contact operation of the developing unit 2 is determined depending on the image which is printed. Further, in the procedure which is shown in FIG. 7, whether or not to execute the separation/contact operation is determined depending on the amount of the toner in the developing unit 2. Further, in the procedure which is shown in FIG. 8, whether or not to execute the separation/contact operation is determined depending on the image which is printed and the amount of the toner in the developing unit 2. In the procedures which are shown in FIG. 6 and FIG. 7, the control is simple, however it is possible to obtain reasonable effects. In the procedure which is shown in FIG. 8, since it is possible to execute the separation/contact operation of the developing unit 2 in a case that it is more necessary, it is possible to minimize interruption (suspension of printing) which is caused by the separation/contact operation of the developing unit 2.

First of all, the procedure of the separation/contact operation decision which is shown in FIG. 6 will be described.

S101: The control portion 141 calculates a high printing ratio integrated calculated value I by adding the high printing ratio index value I1 which is acquired based on the toner consumption amount classification information which is received as the print command to the high printing ratio integrated calculated value I0 which is stored in the RAM 144 of the control portion 141. The high printing ratio index value I1 is the value of "Class 1" which is acquired as described above. Further, the high printing ratio integrated value I0 is a value in which the high printing ratio index value I1 is integrated (added). That is, the high printing ratio integrated value I0 corresponds to an integrated value of the index value which is related to the toner consumption amount due to output of the high printing ratio image, which is saved in the RAM 144 of the control portion 141. As described above, the high printing ratio index value I1 is acquired for each of 16 divided regions of the image forming region with respect to the main scanning direction for each image, and the high printing ratio integrated value I0 is integrated and stored for each of the divided regions. Incidentally, in the embodiment, the image forming region is not divided with respect to the sub scan direction for each image. However, the high printing ratio index value may be acquired for each divided region of the image forming region not only with respect to the main scanning direction but also with respect to the sub scanning direction. In this case, the integrated value of the plurality of high printing ratio index values of the region with respect to the sub scanning direction in a same main scanning direction may be used as the high printing ratio index value I1 which is described above (refer to the second embodiment).

S102: The control portion 141 determines whether the high printing ratio integrated calculated value I is greater than or equal to a high printing ratio threshold value Is by comparing the high printing ratio integrated calculated value which is calculated in S101 with the predetermined high printing ratio threshold value Is. In a case that the control portion 141 determines that the high printing ratio integrated calculated value I is higher than or equal to the high printing ratio threshold value Is in any one of the 16 divided regions of the image forming region with respect to the main scanning direction ("Yes"), blurring may occur in the image which is formed in the region, so it proceeds to a process of S103. On the other hand, in a case that the control portion 141 determines that the high printing ratio integrated calculated value I is less than the high printing ratio threshold value Is in any of the 16 divided regions of the image forming region with respect to the main scanning direction ("No"), blurring does not occur in any regions, so it proceeds to a process of S105.

S103: The control portion 141 executes the separation/contact operation of the developing unit 2 in order to suppress the occurrence of blurring. By executing the separation/contact operation of the developing unit 2, the toner, which adheres to the wall surface in the developing unit 2 and is difficult to use for image forming as it is, is moved, and it is possible to suppress the occurrence of blurring in the high printing ratio image. The separation/contact operation of the developing unit 2 is executed during the sheet interval. In the embodiment, it is not possible to complete the separation/contact operation of the developing unit 2 during a normal sheet interval period in a case that this is not executed, so a sheet interval period is extended and the separation/contact operation of the developing unit 2 is executed. Specifically, the control portion 141 controls to delay a timing of starting subsequent image forming and a timing of conveying subsequent recording material R to the transfer portion N and executes the separation/contact operation of the developing unit 2 during that time, in order to complete the separation/contact operation of the developing unit 2. Further, the separation/contact operation of the developing unit 2 may be repeated a plurality of times (for example, two to five times) during a single sheet interval. By executing the separation/contact operation the plurality times, since it is possible to move the toner in the developing unit 2 which does not move in a single separation/contact operation, it is more effective.

S104: After executing the separation/contact operation of the developing unit 2, the control portion 141 updates the high printing ratio integrated value I0 which is stored in the RAM 144 of the control portion 141 to the high printing ratio index value I1 which is acquired based on the print command this time. In this way, by updating the high printing ratio integrated value I0 to the high printing ratio index value I1 which is acquired this time, it is possible to reflect the toner which is used for image forming this time in the subsequent high printing ratio integrated calculated value I. Thus, it is possible to determine correctly whether or not blurring will occur for the subsequent image forming (value which is accepted in the subsequent print command). After that, the control portion 141 terminates the separation/contact operation decision.

S105: In a case of not executing the separation/contact operation of the developing unit 2, the control portion 141 updates the high printing ratio integrated value I0 which is stored in the RAM 144 of the control portion 141 to the high printing ratio index value I which is calculated this time. That is, the high printing ratio integrated value I0 which is integrated by previous time is updated to the high printing ratio integrated calculated value I in which the high printing ratio index value I1 which is acquired this time is added to the high printing ratio integrated value I0. After that, the control portion 141 terminates the separation/contact operation decision.

In a procedure of the separation/contact operation decision which is shown in FIG. 6, since whether it is necessary or not to execute the separation/contact operation is determined based on the image information, it is possible to execute the separation/contact operation only in a case that the image blurring is likely to occur. Thus, it is possible to suppress unnecessary interruption by executing the separation/contact operation of the developing unit 2 only in a case that it is necessary.

Next, a procedure of the separation/contact operation decision in FIG. 7 will be described.

S111: The control portion 141 determines whether toner amount D is less than or equal to toner amount threshold value Ds by comparing the toner amount D which is indicated by the toner amount information which is stored in the nonvolatile memory 34 with predetermined toner amount threshold value Ds. In a case that the control portion 141 determines that the toner amount D is greater than the toner amount threshold value Ds ("No"), it terminates the separation/contact operation decision and executes the image forming operation (S13 in FIG. 5) without performing the separation/contact operation of the developing unit 2. In this case, it is because the toner amount is sufficient and blurring does not occur even when high printing ratio image is continuously formed. On the other hand, in a case that the control portion 141 determines that the toner amount D is less than or equal to the toner amount threshold Ds ("Yes"), it proceeds to process S112 because blurring may occur when the high printing ratio images are formed continuously.

S112: The control portion 141 executes the separation/contact operation of the developing unit 2 in order to suppress the occurrence of the blurring. The process of S112 which is shown in FIG. 7 is similar to the process of S103 in FIG. 6 above.

In the procedure of the separation/contact operation decision which is shown in FIG. 7, the blurring is determined by the toner amount D. Since the procedure which is shown in FIG. 7 does not require image information as in the procedure which is shown in FIG. 6, it does not require any calculations such as the calculation of the high printing ratio region which is described above. Therefore, it is possible to suppress the occurrence of the blurring while the control is simple.

Next, the procedure of the separation/contact operation decision which is shown in FIG. 8 will be described.

The procedure which is shown in FIG. 8 is the separation/contact operation decision which combines the decision based on the image information in FIG. 6 and the toner amount in FIG. 7. By combining these decisions, it is possible to suppress the interruption which is caused by the separation/contact operation of the developing unit 2 to a minimum.

S121: Similar to the process of S111 which is shown in FIG. 7, the control portion 141 proceeds to S122 in a case that the toner amount D is less than or equal to the predetermined toner amount threshold value Ds (toner amount threshold value at which blurring may occur). Further, in a case that the toner amount D is greater than the predetermined toner amount threshold value Ds, the control portion 141 executes the image forming operation (S13 which is shown in FIG. 5) without performing the separation/contact operation of the developing unit 2, since no blurring occurs even when the high printing ratio images are continuously printed.

From S122 through S126: Processes from S122 through S126 which are shown in FIG. 8 are similar to processes from S101 through S105 which are shown in FIG. 6, respectively. By determining that the toner amount is low in S121 and determining that the image is high printing ratio from S122 through S126, it is possible to execute the separation/contact operation of the developing unit 2 effectively only for images in which blurring may occur.

Incidentally, in the procedure which is shown in FIG. 8, after comparing the toner amount in S121, the high printing ratio integrated value is compared in S123, however, the procedure may be reversed. That is, after firstly comparing the high printing ratio integrated value, the toner amount may be compared.

<Example of Control of the Separation/Contact Operation of the Developing Unit>

Next, an example of control of the separation/contact operation of the developing unit 2 will be described. Here, it will be described in accordance with the separation/contact operation decision in FIG. 8. Since the separation/contact operation decision in FIG. 6 does not include a decision which is related to the toner amount and the separation/contact operation decision in FIG. 7 does not include a decision which is related to the high printing ratio image, it will be described by using the separation/contact operation decision in FIG. 8 which includes a decision which is the toner amount and a decision which is related to the high printing ratio image. Further, as an example, the control of the separation/contact operation of the developing unit 2 will be described here in a case that a full surface solid black image is formed on consecutive three sheets by a process cartridge 1 in which the toner amount D is smaller than the toner amount threshold value Ds.

The control portion 141 receives the print command of a first sheet (S11) and executes the separation/contact operation decision (S12). In the separation/contact operation decision, the control portion 141 compares the toner amount D with the toner amount threshold value Ds (S121) and proceeds to the process of S122 since the toner amount D is smaller than the toner amount threshold value Ds. Next, the control portion 141 calculates the high printing ratio integrated calculated value I (S122). The high printing ratio integrated value I0 which is saved in the RAM 144 of the control portion 141 is 0 before image forming is started. Further, in the embodiment since all surface image is solid black, the high printing ratio index value I1 is "3" in all divided regions with respect to the main scanning direction. Therefore, the high printing ratio integrated calculated value I is "3" (=0+3) in all divided regions with respect to the main scanning direction. Next, the control portion 141 compares the high printing ratio integrated calculated value I with the high printing ratio threshold value Is (S123). In the embodiment, "6" is set as the high printing ratio threshold value Is. In the example, since the high printing ratio integrated calculated value I which is calculated this time is "3", the control portion 141 determines "No" in S123 and proceeds to S126. And the control portion 141 updates the high printing ratio integrated value I0 to "3" which is the high printing ratio integrated calculated value I which is calculated this time (S126), and terminates the separation/contact operation decision. When the control portion 141 terminates the separation/contact operation decision, the image forming operation is started, charging the photosensitive member 11 and driving of the developing unit 2 are started, and an image is formed (S13).

Subsequently, the control portion 141 receives the print command of a second sheet (S11) and executes the separation/contact operation decision again (S12). Similar to a case of the first sheet, the control portion 141 proceeds to the process of S122 after the process of S121 in the separation/contact operation decision. In the separation/contact operation decision on the solid black image of the second sheet, the high printing ratio integrated calculated value I in S122 is "6" in which the high printing ratio integrated value I0 "3" and the high printing ratio index value I1 "3" are added. Next, the control portion 141 compares the high printing ratio integrated calculated value I with the high printing ratio threshold value Is (S123). As described above, "6" is set as the high printing ratio threshold value Is in the embodiment. Therefore, since the high printing ratio integrated calculated value I is greater than or equal to the high printing ratio threshold value Is this time, the control portion 141 determines "Yes" in S123 and proceeds to the process of S124. And the control portion 141 executes the separation/contact operation of the developing unit 2 (S124). Since the process cartridge 1 is being driven (rotation of the photosensitive member 11, the developing roller 31, etc.), the execution of the separation/contact operation of the developing unit 2 is completed by operating the contacting/spacing mechanism 7. It is possible to suppress the occurrence of blurring and output high quality images, since the toner in the developing unit 2 is moved by executing the separation/contact operation of the developing unit 2. When the control portion 141 executes the separation/contact operation of the developing unit 2, the control portion 141 updates the high printing ratio integrated value I0 to the high printing ratio index value (the high printing ratio index value which is acquired this time) I1 of the image which will be formed from now on (S125) and terminates the separation/contact operation decision. When the control portion 141 terminates the separation/contact operation decision, the control portion 141 executes the image forming operation (S13).

Subsequently, the control portion 141 receives the print command of a third sheet. An operation of the separation/contact operation decision for a solid black image of the third sheet is similar to the operation of the separation/contact operation decision for the solid black image of the second sheet, since "3" is stored in the high printing ratio integrated value I0 and the high printing ratio index value I1 is also "3". That is, after the separation/contact operation of the developing unit 2 is executed, image forming operation is executed. When the image forming of the third sheet is completed, since printing of all images of the job is completed, the control portion 11 does not receive any print commands in S11 and terminates the image forming operation (S14). When the image forming operation is completed, the control portion 141 resets the high printing ratio image integrated value I0 to an initial value (0 in the embodiment) (S15).

Incidentally, in the embodiment, the toner which is adhered to the wall surface, etc. in the developing unit 2 is moved by the separation/contact operation of the developing unit 2 in the sheet interval during continuous printing, and the toner is effectively used as toner which is supplied to the developing roller 31. In particular, in the embodiment, a rotational direction of the supplying roller 32 is a direction in which the surface of the supply roller 32 rotates toward a side of the developing roller 31 on a basis of a highest position (apex) of the supplying roller 32 with respect to a gravitational direction. In this way, it is possible to effectively use the toner which is moved by the separation/contact operation of the developing unit 2. In the embodiment, when the developing unit 2 becomes in the state of spacing away, since driving transmission to the developing unit 2 is cut off, the rotational driving of the developing roller 31 and the rotational driving of the supplying roller 32 are also stopped. And when a contacting operation is subsequently started, it is possible to move not only the toner which is adhered to the wall surface, but also the toner around the supplying roller 32 by a stop/drive operation of the supplying roller 32 and it is possible to suppress the occurrence of blurring. Further, in the embodiment, the highest position (apex) of the supplying roller 32 with respect to the gravitational direction is higher than a highest position (apex) of the developing roller 31 with respect to the gravitational direction. In this way, it is possible to use more effectively for suppressing blurring by directing the toner which is moved by the separation/contact operation of the developing unit 2 and the toner around the supplying roller 32 which is moved by the stop/drive operation of the supplying roller 32 toward the developing roller 31 by the rotation of the supplying roller 32. Furthermore, in the embodiment, the rotational direction of the developing roller 31 and the rotational direction of the supplying roller 32 are in a same direction. In this way, it is possible to effectively convey the toner, which is supplied to the developing roller 31 by the supplying roller 32 while it is moved by the separation/contact operation of the developing unit 2, to an opposing portion (developing portion) between the photosensitive member 11 and the developing roller 31. However, the present invention is not limited to such a mode. Even in a configuration in which the supplying roller 32 rotates toward a side so to part from the developing roller 31 which is contrary to the embodiment, it is possible to move the toner in the developing unit 2 by the separation/contact operation of the developing unit 2 and it is possible to obtain a reasonable effect of suppressing the occurrence of blurring. Further, in such a configuration, it is possible to easily suppress the occurrence of blurring by reducing the high printing ratio threshold value Is, for example.

Further, in the embodiment, the high printing ratio integrated value I0, in which the high printing ratio index value of all images which are formed in continuous printing is integrated (added), is compared to the high printing ratio threshold value Is. However, the high printing ratio integrated value I0 is not limited to the value in which the high printing ratio index value of all images which are formed in continuous printing is integrated (added). That is, even in continuous printing, when a low printing ratio image (image with low toner consumption amount) is inserted instead of a series of high printing ratio images, the number of sheets in which high printing ratio images can be formed consequently without occurrence of blurring will be increased. Therefore, it is possible to change the high printing ratio integrated value I0 at any time according to the image information. For example, in a case that a predetermined low printing ratio image is formed during continuous printing, a predetermined value may be subtracted from the high printing ratio integrated I0.

Figure 9:
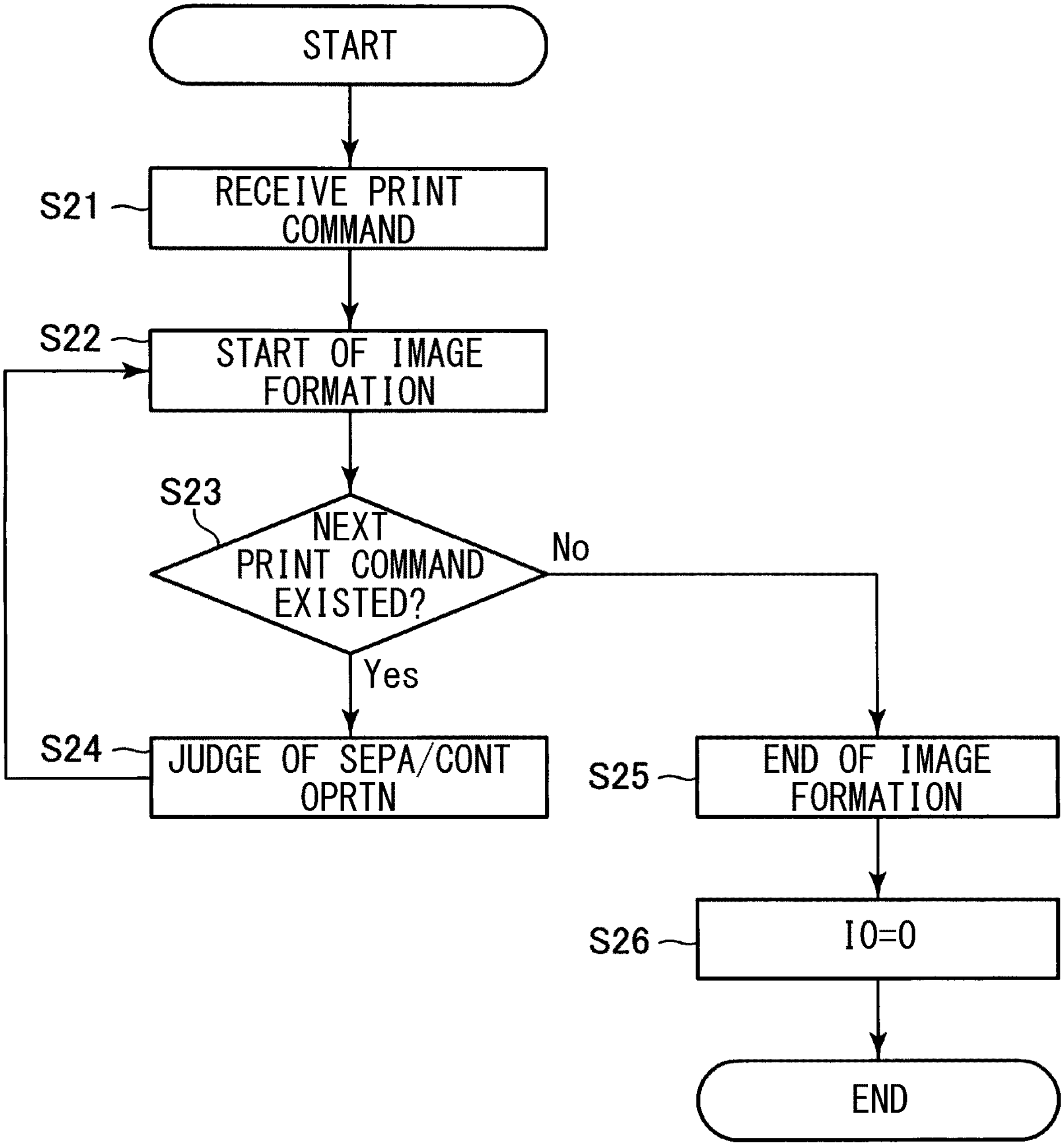
FIG. 9 is a flow chart showing a procedure of a print job according to a modified example of the first embodiment.

Further, in the embodiment, after receiving the print command from the controller 140, the control portion 141 calculates a high printing ratio region of the image which is formed by the print command and determines whether to execute the separation/contact operation of the developing unit 2. In this way, it is possible to effectively execute the separation/contact operation of the developing unit 2 for images in which blurring may be occurred, and on the contrary, it is possible not to execute the separation/contact operation of the developing unit 2 which is not necessary by interrupting the continuous printing for images in which blurring may not occur. However, the present invention is not limited to such a mode, and it is also possible to execute the separation/contact operation of the developing unit 2 for the subsequent image based on a state after image forming. That is, in a case that the high printing ratio image such as a solid black image is formed in continuous printing, for example, blurring may occur in the subsequent image. Therefore, when such a high printing ratio image is formed, it may be controlled to execute the separation/contact operation of the developing unit 2 before the subsequent image. In this way, it is possible to simplify the control. FIG. 9 is a flow chart diagram which illustrates an outline of an entire print job procedure in a case that the separation/contact operation decision is executed for each image forming, rather than the separation/contact operation decision is executed after receiving the print command as in the embodiment. When the control portion 141 receives the print command from the controller 140 (S21), the control portion 141 starts image forming (S22). And the control portion 141 determines whether or not there is the subsequent print command (S23), and in a case that there is the subsequent print, the control portion 141 executes the separation/contact operation decision. This separation/contact operation decision is practically similar to the separation/contact operation decision in the embodiment, except determining necessity of executing the separation/contact operation of the developing unit 2 based on the high printing ratio integrated value I0, in which the high printing ratio index values of the images which have been formed so far are integrated. Further, in a case that the control portion 141 determines that there is no subsequent print command in S23, it terminates the image forming operation (S25) and resets the high printing ratio integrated value I0 to the initial value (0 in the example) (S26). In this way, in the procedure which is shown in FIG. 9, the separation/contact operation decision is executed each time when a sheet of image forming is completed. Therefore, it is possible to suppress the occurrence of blurring no matter what the subsequent image is, by executing the separation/contact operation of the developing unit 2 after forming the high printing ratio image in continuous printing.

In this way, in the embodiment, the image forming apparatus 100 includes the image bearing member 11, the electrostatic image forming member 131 configured to form the electrostatic image on the surface of the image bearing member 11 according to the image information, the developing unit 2 including the developing container 36 configured to accommodate the toner to be supplied to the developing member 31, a transferring means 111 configured to transfer the toner image formed on the surface of the image bearing member 11 to a transferred surface of the sheet of the recording material R, the developing member 31 configured to supply the toner onto the surface of the image bearing member 11 and form the toner image by developing the electrostatic image formed on the surface of the image bearing member 11, and the moving mechanism (contacting/spacing mechanism) 7 capable of moving the developing unit 2 to the first position where the distance between the image bearing member 11 and the developing member 31 is the first distance and the second position where the distance between the image bearing member 11 and the developing member 31 is the second distance longer than the first distance, and executes the image forming operation in which the image is formed on the image bearing member 11 with the toner according to the image information. And in the embodiment the image forming apparatus 100 includes the consumption amount acquiring portion 146 configured to acquire consumption amount information correlating with consumption amount of the toner based on the image information, and the control portion 147 which controls the moving mechanism 7 to execute the moving operation in which the developing unit 2 is moved from the second position to the first position after the developing unit 2 is moved from the first position to the second position in the non-image forming period in a case in which the consumption amount of the toner indicated by the consumption amount information is equal to or less than a predetermined threshold value in the second image forming operation. In the embodiment, the non-image forming period between the first image forming operation which is described above and the second image forming operation which is described above is a period from completing of developing the first electrostatic image to starting of developing the subsequent electrostatic image and this period corresponds to the sheet interval. More specifically, this period is a period from a time when a trailing end of the first image forming region on the photosensitive member 11 with respect to the rotational direction of the photosensitive member 11 passes a developing position to a time when a leading end of the subsequent image forming region with respect to the rotational direction of the photosensitive member 11 reaches the developing position (typically a time when it reaches an exposure position). Incidentally, the developing position corresponds to a position in which toner is supplied from the developing member 31 on the photosensitive member 11 with respect to the rotational direction of the photosensitive member 11 (position in which the developing member 31 contacts). Further, the exposure position (electrostatic image forming position) corresponds to a position in which exposure (electrostatic image forming) is performed on the photosensitive member 11 with respect to the rotational direction of the photosensitive member 11.

In the embodiment, the control portion 147 controls the moving mechanism 7 so as to execute the moving operation which is described above during the non-image forming period between the first image forming operation which is described above and the second image forming operation which is described above, in a case that the toner consumption amount which is indicated by the consumption amount information which is described above by the plurality of image forming operations which include at least the first image forming operation which is described above and the second image forming operation which is described above is equal to or greater than the threshold value which is described above. Further, in the embodiment, the consumption amount acquiring portion 146 acquires the consumption amount information which is described above for each region in which the image forming region on the image bearing member is divided into a plurality of regions in a direction which is substantially perpendicular to the moving direction of the surface of the image bearing member 11. Further, in the embodiment, the consumption amount information which is described above is an index value which correlates with the printing rate which is acquired based on the image information. Further, in the embodiment, the image forming apparatus 100 includes a toner amount acquiring portion 145 which acquires the toner amount information which correlates with the toner amount (weight of toner) in the developing container, and the control portion 147 is possible to control so as to execute the moving operation which is described above based on the consumption amount information which is described above in a case that the toner amount value which is indicated by the toner amount information which is described above after the first image forming operation which is described above and before the second image forming operation which is described above is equal to or less than a predetermined threshold value.

Incidentally, the image forming apparatus 100 may be configured to include the toner amount acquiring portion 145 which acquires the toner amount information correlating with the toner amount (toner weight) in the developing container and the control portion 147 which controls the moving mechanism 7 to execute the moving operation in which the developing unit 2 is moved from the second position which is described above to the first position which is described above after the developing unit 2 is moved from the first position which is described above to the second position which is described above in the non-image forming period between the first image forming operation which is described above and the second image forming operation which is described above in a case in which the toner amount indicated by the toner amount information which is described above is equal to or less than a predetermined threshold value after the first image forming operation which is described above and before the second image forming operation which is described above in a case that the first image forming operation and the second image forming operation which is subsequent to the first image forming operation which is described above are executed. Further, the image forming apparatus 100 may be configured to include the consumption amount acquiring portion 146 configured to acquire consumption amount information correlating with consumption amount of the toner based on the image information which is described above, and the control portion 147 which controls the moving mechanism 7 to execute the moving operation in which the developing unit 2 is moved from the second position which is described above to the first position which is described above after the developing unit 2 is moved from the first position which is described above to the second position which is described above in the non-image forming period between the first image forming operation which is described above and the second image forming operation which is described above in a case in which the consumption amount of the toner indicated by the consumption amount information which is described above is equal to or less than a predetermined threshold value in the first image forming operation which is described above.

Further, in the embodiment, the control portion 147 controls the electrostatic image forming member 131 so that a length of the non-image forming period in a case in which the moving operation is executed in the non-image forming period between the first image forming operation which is described above and the second image forming operation which is described above becomes longer than in a case in which the moving operation is not executed. Further, in the embodiment, in the first image forming operation which is described above and the second image forming operation which is described above, the image is formed to be transferred to the different recording materials R, respectively. However, the image forming apparatus 100 may have a duplex mechanism which conveys the recording material R, on which the toner image is fixed on a first side by the fixing device 121, to the transfer portion N so that the toner image is transferred to a second side of the recording material R, in order to form images on both sides which are the first side of the recording material R and the second side of the recording material R, which are the surfaces to be transferred. In this case, it is also possible to execute the moving operation which is described above during the non-image forming period (corresponding to the sheet interval) between the first image forming operation which forms an image to be transferred on the first side of the first recording material R and the second image forming operation which forms an image to be transferred on the second side of the recording material R.

Further, in the embodiment, the developing unit 2 includes the developing member 31 which is rotatable and a supplying member 32 which is rotatable and supplies the toner to the developing member 31, and the supplying member 32 rotates in a direction for a surface of the supplying member toward the developing member 31 with reference to the highest position of the supplying member 32 in a gravitational direction. Further, in the embodiment, the highest position of the supplying member 32 in the gravitational direction is higher than the highest position of the developing member 31 in the gravitational direction. Further, in the embodiment, the rotational direction of the developing member 31 and the rotational direction of the supplying member 32 are same. Further, in the embodiment, the first position which is described above is a position where the image bearing member 11 and the developing member 31 contact each other. Further, in the embodiment, the developing member 31 develops the electrostatic image by contacting the surface of the image bearing member 11.

As described above, according to the embodiment, it is possible to execute the interruption (separation/contact operation of the developing unit 2) only in a case that it is necessary by determining whether or not an image which is formed during continuous printing is a high printing ratio image. In this way, it is possible to effectively suppress the occurrence of blurring during the continuous printing and output the high quality image. Thus, according to the embodiment, it is possible to suppress the occurrence of blurring even in a case that the high printing ratio image is continuously formed, especially when the amount of the toner in developing unit 2 is low.

Next, other embodiments of the present invention will be described. In the image forming apparatus of the embodiment, same reference numerals as in the first embodiment are added and detailed descriptions are omitted, with regards to elements which include functions or configurations the same as or corresponding to those of the image forming apparatus according to the first embodiment.

1. Overall Configuration and Operation of Image Forming Apparatus

Figure 10:
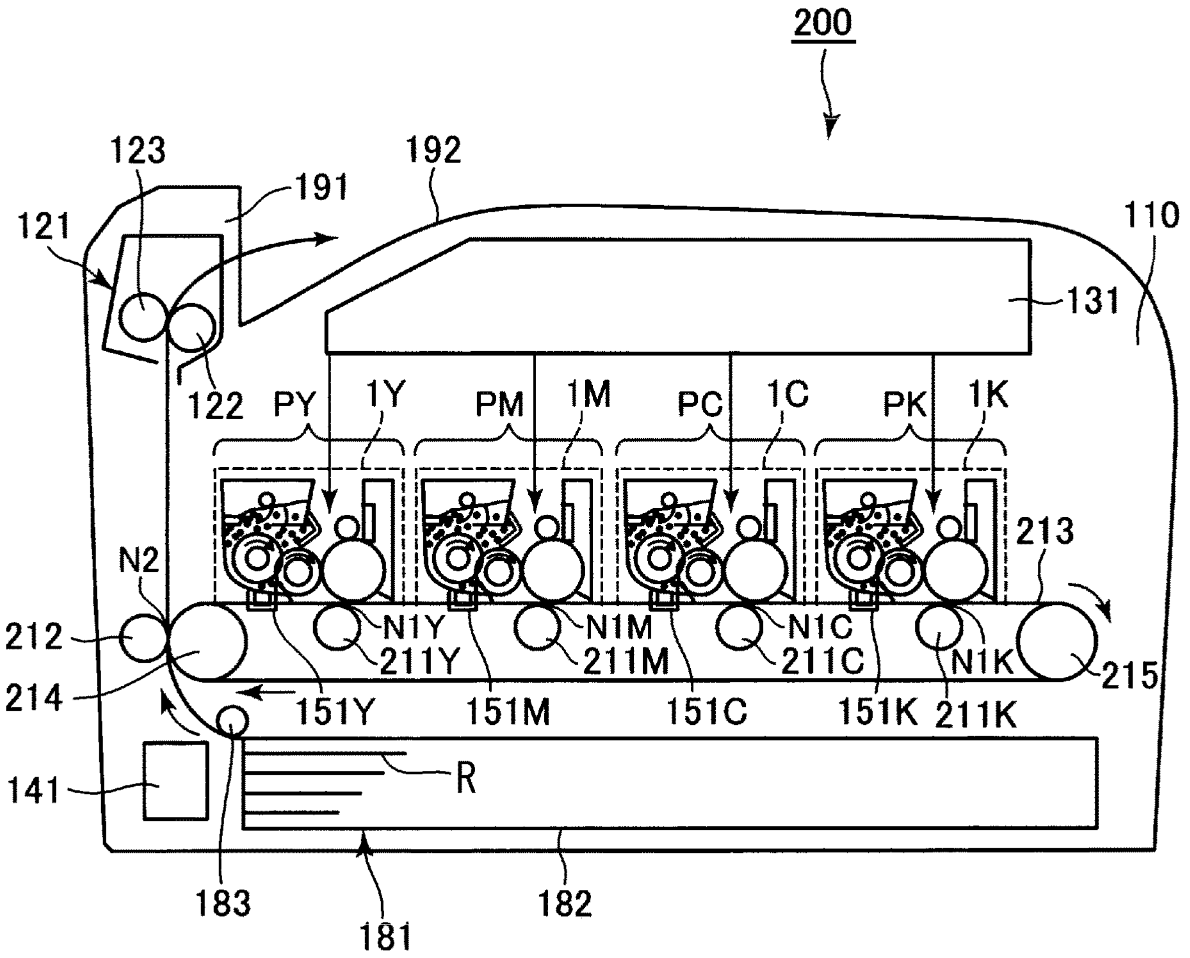
FIG. 10 is a schematic sectional view of the image forming apparatus according to a second embodiment.

FIG. 10 is a schematic sectional view of the image forming apparatus 200 according to the embodiment. The image forming apparatus 200 according to the embodiment is a tandem type full color laser printer applying an intermediary transfer method which is capable of forming a full color image.

The image forming apparatus 200 according to the embodiment includes four image forming portions PY, PM, PC and PK which form yellow (Y), magenta (M), cyan (C) and black (K) images, respectively. Elements which include functions or configurations the same as or corresponding to each image forming portion PY, PM, PC and PK, will be described comprehensively by omitting Y, M, C and K at an end of the reference numeral which indicates that the element is for one of the colors.

The image forming portion P includes the process cartridge 1 which is dismountable. Color of the toner which is accommodated in each of the four process cartridges 1Y, 1M, 1C and 1K is different and the colors are four which include three primary colors of yellow (Y), magenta (M) and cyan (C), and black (K). The configuration and the operation of the process cartridge 1 according to the embodiment are the same as the configuration and the operation of the process cartridge 1 according to the first embodiment. The process cartridge 1 includes the photosensitive member 11, the charging roller 21, developing unit 2 and the cleaning device 6. Further, the image forming portion P includes a primary transfer roller 211 which is a roller type primary transfer member as a primary transfer means. Further, in the embodiment, the image forming apparatus 200 includes the exposure device 131 which is configured as a single unit which exposes the photosensitive members 11 of each of the four image forming portions PY, PM, PC and PK.

An intermediary transfer belt 213, which is configured of a rotatable endless belt as an intermediary transfer member, is arranged so as to oppose the photosensitive member 11 in each image forming portion P. The intermediary transfer belt 213 is stretched over a driving roller 214 and a tension roller 215 as a plurality of tension rollers (supporting rollers) and is stretched with a predetermined tension. The intermediary transfer belt 213 rotates (moves peripherally) when the driving roller 214 is rotationally driven by driving power which is transmitted from a belt driving motor (not shown) as a driving source which configures a driving means. On an inner peripheral surface side of the intermediary transfer belt 213, the primary transfer rollers 211 which is described above is arranged corresponding to the photosensitive members 11 in each image forming portion P. The primary transfer roller 211 presses the intermediary transfer belt 213 toward the photosensitive member 11 and forms the primary transfer portion (primary transfer nip) N1 which is a contact portion between the photosensitive member 11 and the intermediary transfer belt 213. Further, on an outer peripheral surface side of the intermediary transfer belt 213, a secondary transfer roller 212, which is a roller type secondary transfer member as a secondary transfer means, is arranged at a position opposing the driving roller 214 which also serves as a secondary transfer opposing roller. The secondary transfer roller 212 contacts against the driving roller 214 via the intermediary transfer belt 213 and forms the secondary transfer portion (secondary transfer nip) N2 which is a contact portion between the intermediary transfer belt 213 and the secondary transfer roller 212.

For example, when forming a full color image, the toner of each color of Y, M, C and K which is formed on each of the photosensitive members 11 is sequentially transferred (primary transferred) so as to be overlapped onto the intermediary transfer belt 213 which is rotating by an action of each of the primary transfer rollers 213 at each of the primary transfer portions N1. The toner image which is formed on the intermediary transfer belt 213 is transferred (secondary transfer) onto the recording material R which is nipped and conveyed between the intermediary transfer belt 213 and the secondary transfer roller 212 by an action of the secondary transfer roller 212 at the secondary transfer portion N2. The recording material R is conveyed to the second transfer portion N2 from the sheet feeding portion 181, while timing is matched with the toner image on the intermediary transfer belt 213. In the image forming apparatus of the intermediary transfer method, a transfer means which transfers the toner image which is formed on the surface of the image bearing member to a transferred surface of the sheet of the recording material at the transfer portion (the secondary transfer portion in this case) by the intermediary transfer member, the primary transfer member, the secondary transfer member, etc.

Further, similar to a case in the first embodiment, it is possible to move the developing unit 2 of each of the image forming portions P between the contacting position and the spacing position by means of the contacting/spacing mechanism 7 in the image forming apparatus 200 according to the embodiment. In the embodiment, the moving portions 151 are provided for the developing units 2 of the image forming portions P, respectively. However, in the embodiment, the operation of the movement from the contacting position to the spacing position and the operation of the movement from the spacing position to the contacting position of the developing unit 2 in each image forming portion P are executed in interrelation with all of the image forming portions P. For example, when image forming is started, the developing unit 2 moves from the spacing position to the contacting position, however, in the embodiment, all of the developing units 2 in four of the image forming portions P move from the spacing position to the contacting position substantially simultaneously. The same applies to the separation/contact operation of the developing unit 2 which is executed between the sheet intervals during continuous printing. Control of the operation of the contacting/spacing mechanism 7 is executed by the control portion 141. Incidentally, it may be integrally moved by integrating the moving portions corresponding to the plurality of image forming portions P, etc.

2. Calculation of High Printing Ratio Region

Next, acquiring the high printing ratio index value (calculation of high printing ratio region) to determine high printing ratio region in the embodiment will be described. In the embodiment, the control portion 141 acquires the high printing ratio index value based on the image density information (printing ratio information) which is received from the controller 140. The controller 140 divides the image information which is requested to be printed by a print instruction which is received from the external device into each of predetermined sizes and delivers the image density information for each of the divided regions to the control portion 141 with the print command. By receiving the image density information as the print command, the control portion 141 is able to determine whether or not the image is a high printing ratio image before executing the image forming operation by the print command.

In the embodiment, the control portion 141 requests the toner consumption amount classification information (image density classification information, printing ratio classification information) based on the density information which is received from the control portion 141 for each of the divided regions which are described above. In the embodiment, the control portion 141 separates the density information which is received for each of the divided regions which are described above by color and converts it into the image density information (printing ratio information) for each color of Y, M, C and K. And based on the image density information for each color of Y, M, C and K, the control portion 141 acquires the high printing ratio index value to determine the high printing ratio region of the image which is formed by each of four of the image forming portions PY, PM, PC and PK. That is, the control portion 141 first converts from RGB information as the density information of the image which is displayed on a monitor (display portion) of the external device to the image density information of each color of Y, M, C and K by means of a YMCK color table. And the control portion 141 first assigns following two classes of toner consumption amount classification information to each of the divided regions which are described above based on the image density information for each color of Y, M, C and K which is converted. Image density of the solid image (highest density level, maximum toner application amount) is defined as 100%, and a region in which the image density is 80% or higher is defined as "Class A". Further, a region in which the image density is less than 80% is defined as "Class B". Furthermore, the control portion 141 assigns following four classes of values to "Class A" corresponding to the area ratio of the image. In a case that the area ratio is 80% or more, "3" is assigned; in a case that the area ratio is 60% or more, "2" is assigned; in a case that the area ratio is 40% or less, "1" is assigned; and in a case that the area ratio is less than 40%, "0" is assigned. Incidentally, "0" is assigned to "Class B" regardless of the area ratio.

In the embodiment, the image forming region is divided into equal size areas in the sub scanning direction (vertical direction) and the main scanning direction (horizontal direction). Since the sub scanning direction is a direction of image forming process, it is possible to predict the occurrence of blurring by integrating the high printing ratio index values of the divided regions in the sub scanning direction by regions in the same main scanning direction. In the embodiment, for example, in printing on the recording material R which is Letter size, the image density information for a region which is divided into 8 sections in the main scanning direction and 10 sections in the sub scanning direction is delivered from the controller 140 to the control portion 141.

In the embodiment, the control portion 141 determines whether or not it is the high printing ratio region based on the value in which values of "Class A" which is described above and is acquired for each of divided regions are integrated in the sub scanning direction by a region in the same main scanning direction. That is, in the embodiment, the control portion 141 uses the value which is acquired by integrating the value of "Class A" in the toner consumption amount classification information in the sub scanning direction by the region in the same main scanning direction as the "high printing ratio index value" which is an example of an index value which is related to the toner consumption amount from the developing unit 2 which is associated with image forming. For example, a case that forming a solid image which is a vertical band extending in the sub scanning direction with a thickness of 4 or more divisions in the main scanning direction. In this case, the control portion 141 assigns the high printing ratio index value of "3" to each of the divided regions in the sub scanning direction in a position (region) with the image in the main scanning direction. And the control portion 141 integrates the high printing ratio index values for each of the divided regions in the sub scanning direction by the region in the same main scanning direction area. Therefore, in the position (region) with the image in main scanning direction, the high printing ratio index value (integrated value) I1 is "30" (=3×10).

3. Control of Separation/Contact Operation of Developing Unit

Figure 11:
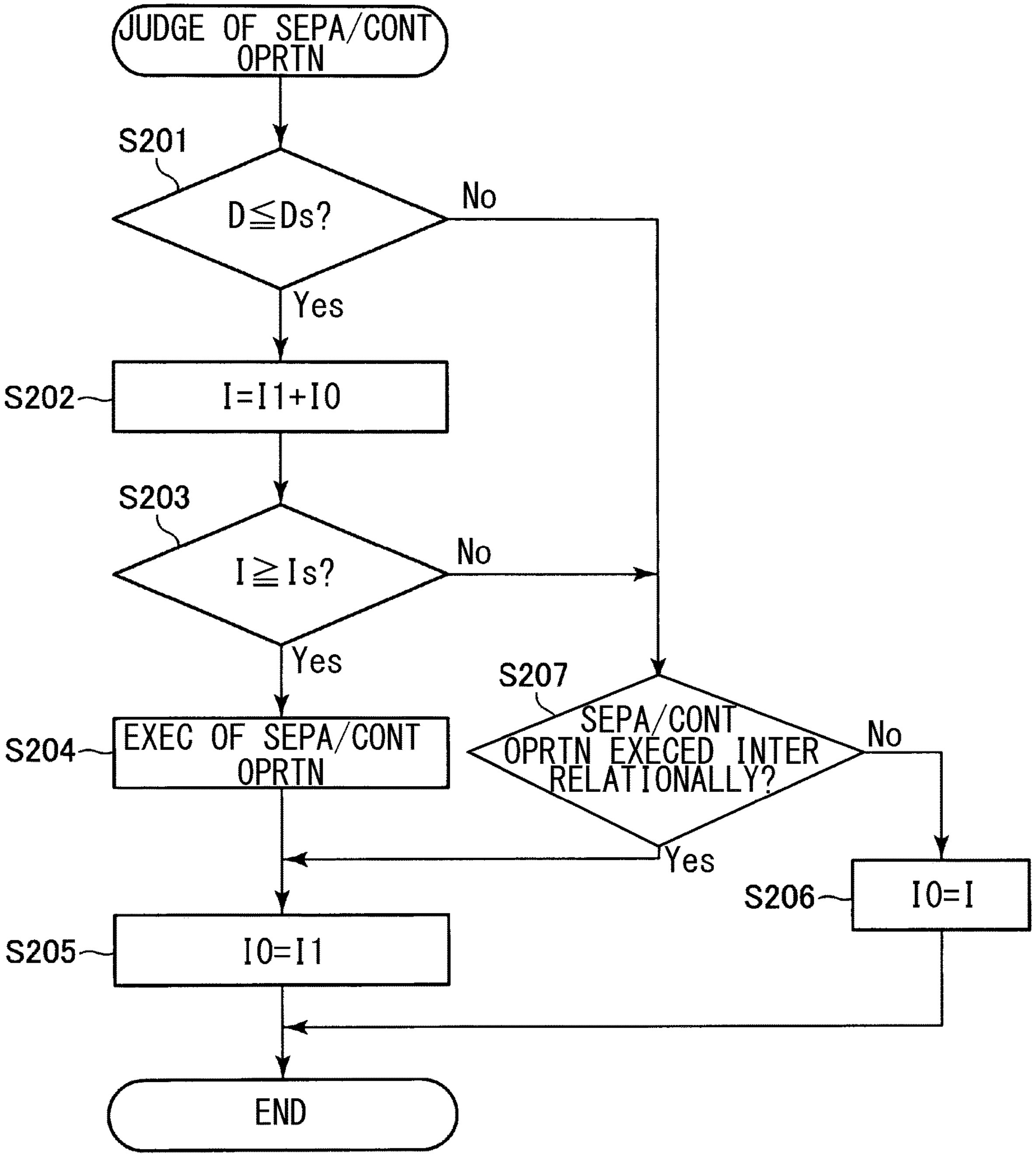
FIG. 11 is a flow chart showing a procedure of a separation/contact operation determination according to the second embodiment.

Next, control of the separation/contact operation of the developing unit 2 according to the embodiment will be described. FIG. 11 is a flow chart showing the outline of the procedures for the separation/contact operation decision according to the embodiment.

The entire procedure for the print job according to the embodiment is the same as the one according to the first embodiment which is described by using FIG. 5. However, in the embodiment, it is different from the first embodiment in that the separation/contact operation decision according to the procedure which is shown in FIG. 11 is executed for each of four of the image forming portions PY, PM, PC and PK in the separation/contact operation decision.

A basic procedure of the separation/contact operation decision which is shown in FIG. 11 in the embodiment is the same as one in the first embodiment which is described by using FIG. 8. That is, for each of the image forming portion PY, PM, PC and PK, processes from S201 through S206 in FIG. 11 is the same as ones from S121 through S126 in FIG. 8, respectively. However, in the embodiment, in a case that the high printing ratio integrated calculated value I is equal to or higher than the high printing ratio threshold Is even for an image which is formed in any one of the image forming portions P, it is different from a case in the first embodiment in that the separation/contact operation of the developing unit 2 is executed in all of the image forming portions P. This differs from the embodiment 1. This is because in the embodiment, the movement of the developing unit 2 by the contacting/spacing mechanism 7 is not executed separately in each of the image forming portions P, but is executed in interrelation with all of the image forming portions P. Incidentally, in the embodiment, it is possible to use the separation/contact operation decisions which are shown in FIG. 6 and FIG. 7 which are described in the first embodiment 1, instead of the separation/contact operation decision which is shown in FIG. 8 which is described in the first embodiment.

That is, the separation/contact operation of the developing unit 2 may be executed even in a case that some image forming portion P is determined to be "No" in S121 and S123 respectively which are shown in FIG. 8. Therefore, in the embodiment, a process of S207 in FIG. 11 is provided. In S207, the control portion 141 determines whether or not the separation/contact operation of the developing unit 2 is determined to be necessary with respect to the other image forming portion P. And in a case that the separation/contact operation of the developing unit 2 is executed in conjunction with an execution of the separation/contact operation of the developing unit 2 in the other image forming portion P, the control portion 141 proceeds to a process of S205 (corresponding to S125 which is shown in FIG. 8), even in a case that the control portion 141 determines to be "No" in S201 and S203 respectively. In this way, in the embodiment, when it is determined that the separation/contact operation of the developing unit 2 is necessary in any one of the image forming portions P, the separation/contact operation of the developing unit 2 is also executed in the other portions P. Therefore, in a case that the separation/contact operation of the developing unit 2 is executed in this way, a previous high printing ratio integrated value I0 is reset to the high printing ratio index value I1 which is acquired this time. On the other hand, in a case that the control portion 141 does not execute the separation/contact operation of the developing unit 2 in any of the image forming portions P, it proceeds to a process of S206 (corresponding to S126 which is shown in FIG. 8). In FIG. 11, for simplification, it proceeds to the process of S206 in a case that it is determined to be "No" in S201 and S203 respectively, however, it is not necessary to update the high printing ratio integrated value I0 in a case that it is determined to be "No" in S201.

In this way, in the embodiment, the image forming apparatus 200 includes a first image forming portion (for example, PY) which is provided with an image bearing member and a developing unit, and a second image forming portion (for example, PK) which is provided with another image bearing member and another developing unit. Further, in the embodiment, in addition to that the moving mechanism 7 is capable of moving the developing unit which is described above to the first position which is described above and the second position which is described above, the moving mechanism 7 is capable of moving the other developing unit which is described above to a third position in which a distance between the other image bearing member which is described above and the other developing member which is described above is a third distance and to a forth position in which a distance between the other image bearing member which is described above and the other developing member which is described above is longer than the third distance which is described above. And in the embodiment, in a case that the moving operation which is described above is executed in the first image forming portion which is described above, the control portion 147 controls the moving mechanism 7 to execute the other moving operation in interrelation with the moving operation from the fourth position which is described above to the third position which is described above after the other developing unit which is described above is moved from the third position which is described above to the fourth position which is described above in the second image forming portion which is described above. The third position which is described above is a position in which the other image bearing member which is described above contacts the other developing member which is described above. Further, the other developing member which is described above contacts a surface of the other image bearing member which is described above and develops an electrostatic image.

As described above, according to the embodiment, similar to the first embodiment, it is possible to suppress the occurrence of blurring, especially when the amount of the toner in the developing unit 2 is low and a case that high printing images are formed continuously, etc. Further, in the embodiment, in a case that it is determined that blurring may occur in any one of the image forming portions P, the separation/contact operation of the developing unit 2 is performed in interrelation with all of the image forming portions P. Thus, it is possible to suppress the occurrence of blurring in all of the image forming portions by using efficiently the sheet interval period during continuous printing Incidentally, in the embodiment, the high printing ratio region is calculated after converting it to each of the image density information for Y, M, C and K in the control portion by using the image density information from the controller. However, the present invention is not limited to such a mode, for example, it is also possible to calculate the high printing ratio region without converting the image density from the controller to each of the image density information for Y, M, C and K. In this way, compared to a case of calculating the high printing ratio region by the image density information from the controller, it is possible to determine whether it is necessary or not to execute the separation/contact operation of the developing unit 2 more accurately by calculating the high printing ratio region for each color such as in the embodiment. On the other hand, in a case of calculating the high printing ratio region by the image density information from the controller, accuracy of decision on whether it is necessary or not to execute the separation/contact operation of the developing unit 2 may be reduced since the high printing ratio region is not calculated for each color. In this case, the separation/contact operation of the developing unit 2 may be executed as an interruption of the sheet interval for an image in which necessity for the separation/contact operation of the developing unit 2 is low. However, in this case, it is possible to suppress the occurrence of blurring in subsequent prints while the control is simplified.

So far, the present invention is described above in terms of specific embodiments, the present invention is not limited to the embodiments which is described above.

In the embodiment which is described above, the developing unit applies single component non-magnetic toner as developer, however it may also apply single component magnetic toner or two component developer which is provided with toner and carrier.

Further, in the embodiment which is described above, in the separation/contact operation of the developing unit which is executed in the sheet interval during continuous printing, the developing unit is returned to the contacting position after the developing unit is once arranged in a complete spacing position (position in which it is arranged when the image forming apparatus is stopped such as a stand-by state). However, the present invention is not limited to such a mode, in the separation/contact operation of the developing unit, the developing unit may be returned to the contacting position after the developing unit is once moved to a position between the contacting position and the complete spacing position which is described above (developing member is spaced away from the photosensitive member). Further, the developing unit may be operated to move between a plurality of positions in which each of the developing members is spaced away from the photosensitive member and whose distances to the photosensitive member is different. Furthermore, even in a case that the developing unit is configured to perform developing in a state that the developing member does not contact against the photosensitive member but is close to the photosensitive member, it is possible to achieve a similar effect to the embodiment which is described above by applying the present embodiment.

Further, in the second embodiment, the separation/contact operation of the developing unit is executed in interrelation with the plurality of image forming portions in the single sheet interval. Therefore, it is possible to reduce possibility during continuous printing, for example, that it may be necessary to execute the separation/contact operation of the developing unit in the other image forming portion after executing the separation/contact operation of the developing unit in one image forming portion. That is, it is possible to efficiently suppress the occurrence of blurring by reducing downtime. However, the present invention is not limited to such a mode, and it may be designed to execute the separation/contact operation of the developing unit separately in the plurality of image forming portions.

In the present invention, it is also possible to apply to the other embodiment in which some or all of configurations according to the embodiment which is described above are replaced by alternative configurations. In the present invention, it is possible to apply without distinction among a tandem type/a one-drum type, a charging method, an electrostatic image forming method, a developing method, a transferring method and a fixing method. In the embodiments which are described above, main portions which are related to toner image forming/transferring are mainly described, however, in the present invention, it is possible to apply to various purposes such as printers, various printing machines, copiers, fax machines, multifunction printers, etc. by adding necessary devices, equipment and casing structures.

According to the present invention, it is possible to suppress the occurrence of blurring even in such a case that the high printing ratio images are formed continuously.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-072783 filed on Apr. 26, 2022, which is hereby incorporated by reference herein in its entirety.

What is claimed is:

1. An image forming apparatus comprising:

an image bearing member;

an electrostatic image forming portion configured to form an electrostatic image on a surface of the image bearing member according to an image information;

a developing unit including a developing member configured to supply toner onto the surface of the image bearing member and form a toner image by developing the electrostatic image formed on the surface of the image bearing member, and a developing container configured to accommodate the toner to be supplied to the developing member;

a transfer member configured to transfer the toner image formed on the surface of the image bearing member to a recording material;

a moving mechanism capable of moving the developing unit to a first position where a distance between the image bearing member and the developing member is a first distance and a second position where a distance between the image bearing member and the developing member is a second distance longer than the first distance;

a control portion configured to control so as to execute an image forming operation in which a toner image is formed with the toner according to the image information; and a consumption amount acquiring portion configured to acquire toner consumption amount information correlating with consumption amount of the toner based on the image information, wherein when a period between a first image forming operation and a second image forming operation subsequent to the first image forming operation is defined as a non-image forming period, the control portion controls the moving mechanism to execute a moving operation in which the developing unit is moved from the second position to the first position after the developing unit is moved from the first position to the second position in the non-image forming period in a case in which the consumption amount of the toner indicated by the consumption amount information is equal to or more than a predetermined threshold value in the second image forming operation, and wherein the control portion controls the electrostatic image forming portion so that a length of the non-image forming period in a case in which the moving operation is executed in the non-image forming period becomes longer than in a case in which the moving operation is not executed.

2. An image forming apparatus according to claim 1, wherein the consumption amount acquiring portion acquires the consumption amount information for each area obtained by dividing an image forming area on the image bearing member into a plurality of areas with respect to a direction substantially perpendicular to a moving direction of the surface of the image bearing member.

3. An image forming apparatus according to claim 1, wherein the consumption amount information is an index value correlating with a printing rate acquired based on the image information.

4. An image forming apparatus according to claim 1, further comprising a toner amount acquiring portion configured to acquire toner amount information correlating with a toner amount in the developing container, wherein the control portion controls to execute the moving operation based on the consumption amount information in a case in which the toner amount indicated by the toner amount information is equal to or less than the predetermined threshold value after the first image forming operation and before the second image forming operation.

5. An image forming apparatus according to claim 1, wherein in the first image forming operation and the second image forming operation, the image is formed to be transferred to the different recording materials, respectively.

6. An image forming apparatus according to claim 1, wherein the first position is a position where the image bearing member and the developing member contact each other.

7. An image forming apparatus according to claim 1, wherein the developing member develops the electrostatic image by contacting the surface of the image bearing member.

8. An image forming apparatus according to claim 1, further comprising a first image forming portion provided with the image bearing member and the developing unit; and a second image forming portion, when the image bearing member and the developing unit are a first image bearing member and a first developing unit, respectively, provided with a second image bearing member and a second developing unit, the second developing unit including a second developing member configured to supply toner onto a surface of the second image bearing member and form a toner image by developing an electrostatic image formed on the surface of the second image bearing member, and a second developing container configured to accommodate the toner to be supplied to the second developing member, wherein the electrostatic image forming portion forms the electrostatic image on the surface of the first image bearing member and the surface of the second image bearing member according to the image information, respectively, wherein the transfer member transfers the toner image formed on the surface of the first image bearing member and the surface of the second image bearing member to the recording material, wherein the moving mechanism capable of moving the first developing unit to the first position and the second position, and the second developing unit to a third position where a distance between the second image bearing member and the second developing member is a third distance and a fourth position where a distance between the second image bearing member and the second developing member is a fourth distance longer than the third distance, and wherein, in which the moving operation is executed in the first image forming portion, the control portion controls the moving mechanism to execute a second moving operation in interrelation with the moving operation in which the second developing unit is moved from the fourth position to the third position after the second developing unit is moved from the third position to the fourth position in the second image forming portion.

9. An image forming apparatus according to claim 8, wherein the third position is a position where the second image bearing member and the second developing member contact each other.

10. An image forming apparatus according to claim 8, wherein the second developing member develops the electrostatic image by contacting the surface of the second image bearing member.

* * * * *